(12) United States Patent
Steele

(10) Patent No.: US 12,529,713 B2
(45) Date of Patent: Jan. 20, 2026

(54) INTEGRATED CIRCUIT PACKAGE INCLUDING AN INTEGRATED SHUNT RESISTOR

(71) Applicant: Microchip Technology Incorporated, Chandler, AZ (US)

(72) Inventor: Gerald Steele, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 195 days.

(21) Appl. No.: 18/143,414

(22) Filed: May 4, 2023

(65) Prior Publication Data

US 2024/0125818 A1    Apr. 18, 2024

Related U.S. Application Data

(60) Provisional application No. 63/416,985, filed on Oct. 18, 2022.

(51) Int. Cl.
*G01R 1/20* (2006.01)
*G01R 1/04* (2006.01)
*G01R 1/30* (2006.01)
*G01R 19/32* (2006.01)

(52) U.S. Cl.
CPC ............ *G01R 1/203* (2013.01); *G01R 1/0416* (2013.01); *G01R 1/30* (2013.01); *G01R 19/32* (2013.01)

(58) Field of Classification Search
CPC ........ G01R 1/203; G01R 1/0416; G01R 1/30; G01R 19/32; G01R 19/0092
USPC .......................................................... 324/126
See application file for complete search history.

(56) References Cited

U.S. PATENT DOCUMENTS

| 6,150,714 A * | 11/2000 | Andreycak | H01L 23/495 257/536 |
| 2007/0063333 A1* | 3/2007 | Mohd Arshad | H01L 23/3107 257/690 |
| 2014/0266269 A1* | 9/2014 | Ausserlechner | G01R 19/00 324/713 |
| 2020/0379014 A1* | 12/2020 | Kawaguchi | G01R 19/0092 |
| 2021/0175326 A1 | 6/2021 | Romig et al. | |

(Continued)

FOREIGN PATENT DOCUMENTS

CN          109478449 A  *  3/2019  ............. H01C 17/24

OTHER PUBLICATIONS

International Search Report and Written Opinion, Application No. PCT/US2023/035393, 15 pages, Feb. 16, 2024.

*Primary Examiner* — Arleen M Vazquez
*Assistant Examiner* — Robert P Alejnikov, Jr.
(74) *Attorney, Agent, or Firm* — SLAYDEN GRUBERT BEARD PLLC

(57) ABSTRACT

An integrated circuit (IC) package includes a partial leadframe including (a) a shunt resistor leadframe element including a pair of shunt resistor contacts and a shunt resistor conductively connected between the pair of shunt resistor contacts and (b) at least one external contact leadframe element separate from the shunt resistor leadframe element, the at least one external contact leadframe element allowing external contact to the IC package. The IC package also a mold encapsulation formed over the shunt resistor leadframe element, wherein the pair of shunt resistor contacts are externally contactable through the mold encapsulation.

23 Claims, 19 Drawing Sheets

(56) References Cited

U.S. PATENT DOCUMENTS

2023/0170112 A1\* 6/2023 Kameko .................. H01C 1/14
324/126

\* cited by examiner

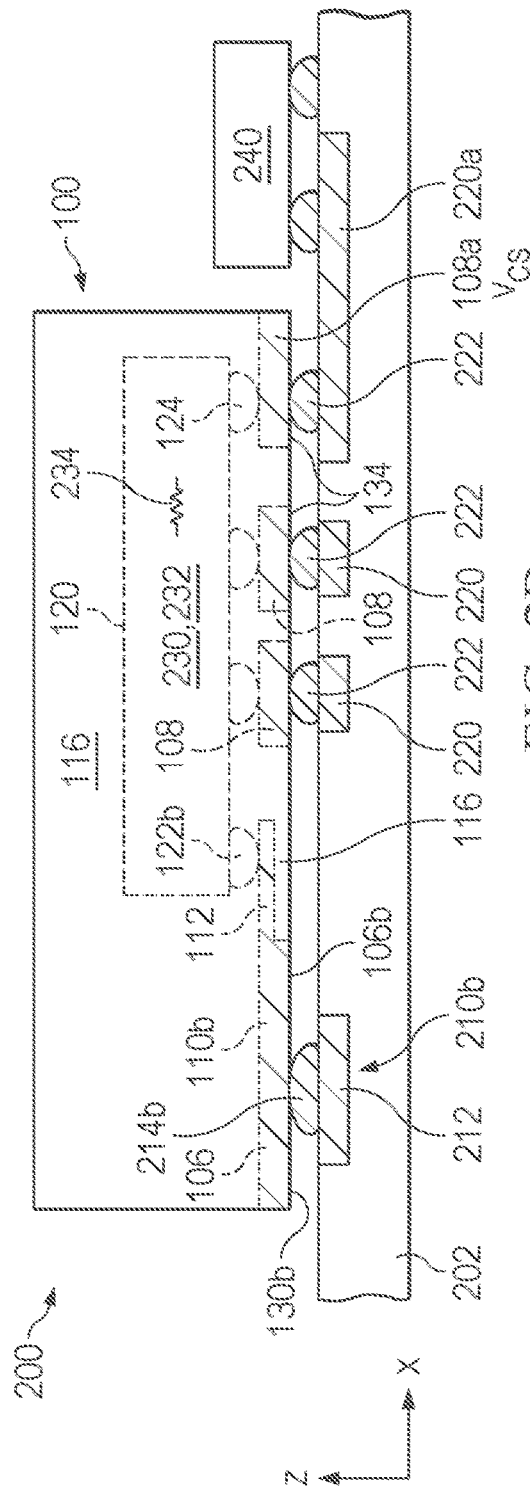
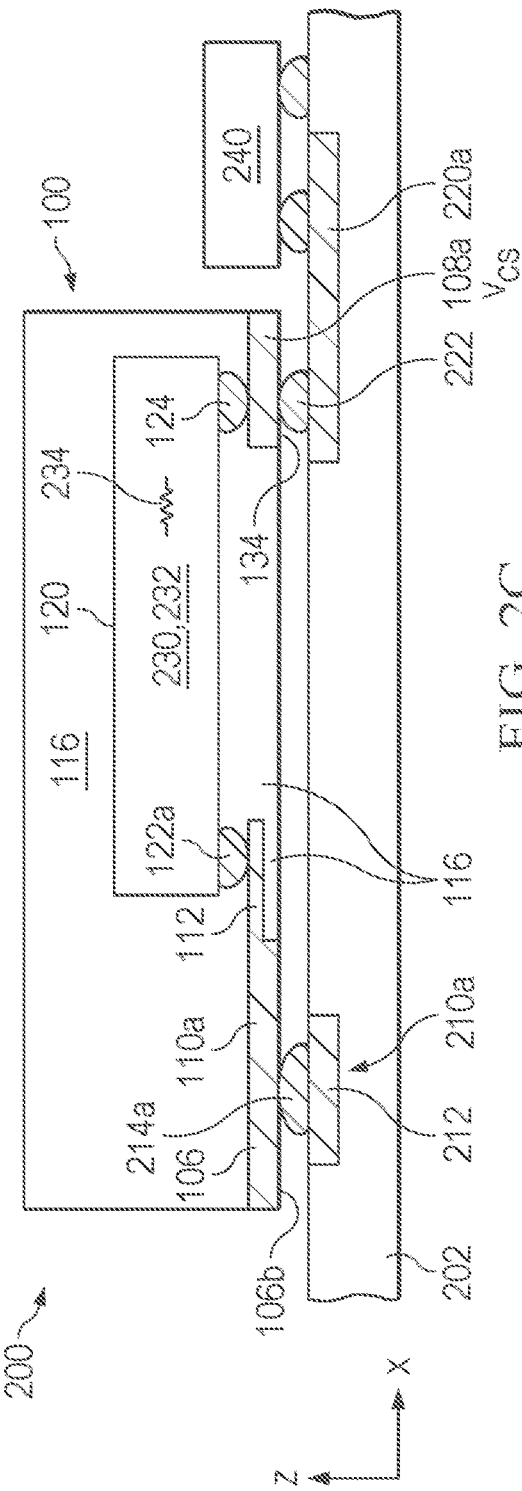
FIG. 2B
FIG. 2C

INTEGRATED CIRCUIT PACKAGE INCLUDING AN INTEGRATED SHUNT RESISTOR

RELATED PATENT APPLICATION

This application claims priority to commonly owned U.S. Provisional Patent Application No. 63/416,985 filed Oct. 18, 2022, the entire contents of which are hereby incorporated by reference for all purposes.

TECHNICAL FIELD

The present disclosure relates to electronic devices, and more particularly to an integrated circuit (IC) package including an integrated shunt resistor.

BACKGROUND

Conventional current sense devices are often large, complex, expensive, and inaccurate. For example, the ACS711 current sensor by Allego MicroSystems of Manchester, New Hampshire, provides a magnetic (hall effect) sensor integrated in a quad flat, no leads (QFN) package. However, the Allego ACS711 current sensor is relatively expensive and exhibits relatively low accuracy.

There is a need for an improved integrated circuit (IC) current sense package having an integrated shunt resistor.

SUMMARY

As disclosed herein, an IC current sense package may include an integrated shunt resistor, an (optional) IC die including current sense circuitry to sense a current through the shunt resistor, and a mold encapsulation formed over the integrated shunt resistor and the IC die. The IC current sense package may be formed as a flat, no leads package, e.g., a quad flat, no leads (QFN) package.

In some examples, the integrated shunt resistor is formed as a component of a leadframe on which the IC die is mounted. In some examples, the current sense circuitry may include a current sense amplifier and a temperature compensation resistor having a same or similar temperature coefficient of resistance (TCR) as the integrated shunt resistor (e.g., differing by less than 10%, less than 5%, or less than 1%, depending on the particular example). For example, the temperature compensation resistor may be formed from the same material as the integrated shunt resistor, e.g., pure copper.

One aspect provides an integrated circuit (IC) package including a partial leadframe comprising (a) a shunt resistor leadframe element including a pair of shunt resistor contacts and a shunt resistor conductively connected between the pair of shunt resistor contacts, and (b) at least one external contact leadframe element separate from the shunt resistor leadframe element. The IC package may include a mold encapsulation formed over the shunt resistor leadframe element. The at least one external contact leadframe element and the pair of shunt resistor contacts may be externally contactable through the mold encapsulation.

In some examples, the partial leadframe is formed from pure copper.

In some examples, the pair of shunt resistor contacts are exposed through the mold encapsulation, and the shunt resistor is not exposed through the mold encapsulation.

In some examples, the IC package includes an IC die connected to the shunt resistor leadframe element, the IC die comprising current sense circuitry to sense a current through the shunt resistor, wherein the mold encapsulation is formed over the IC die.

In some examples, the IC die is solder bonded to the shunt resistor at a pair of spaced apart locations on the shunt resistor.

In some examples, the IC die is ball-down solder bonded to the shunt resistor at a pair of spaced apart locations on the shunt resistor.

In some examples, the shunt resistor leadframe element has a first side and a second side opposite the first side, the IC die is connected to the shunt resistor on the first side of the shunt resistor leadframe element, and respective surfaces of the pair of shunt resistor contacts on the second side of the shunt resistor leadframe element are exposed through the mold encapsulation.

In some examples, the current sense circuitry in the IC die comprises a temperature compensation resistor, wherein a temperature coefficient of resistance of the temperature compensation resistor differs from a temperature coefficient of resistance of the shunt resistor by less than 5%.

In some examples, the current sense circuitry in the IC die comprises a current sense amplifier to provide a voltage representing a current through the shunt resistor.

In some examples, the IC die is connected to the at least one external contact leadframe element, and the current sense circuitry in the IC die comprises a current sense amplifier to provide a current sense voltage at a respective external contact leadframe element of the at least one external contact leadframe element.

In some examples, the IC die is connected to a respective first side of the at least one external contact leadframe element, and a respective second side of the at least one external contact leadframe element, opposite the respective first side of the at least one external contact leadframe element, is exposed through the mold encapsulation.

In some examples, the IC package comprises a flat, no leads package.

In some examples, the IC package comprises a quad flat, no leads (QFN) package.

One aspect provides an IC package including an integrated shunt resistor element, an external contact element, an IC die, and a mold encapsulation. The integrated shunt resistor element includes a pair of shunt resistor contacts, and a shunt resistor conductively connected between the pair of shunt resistor contacts. The external contact element is separate from the integrated shunt resistor element, and allows external contact to the IC package. The IC die is connected to both the integrated shunt resistor element and the external contact element, and includes current sense circuitry to sense a current through the shunt resistor, the current sense circuitry including a temperature compensation resistor. A temperature coefficient of resistance (TCR) of the temperature compensation resistor differs from a TCR of the shunt resistor by less than 5%. The mold encapsulation is formed over the integrated shunt resistor element and the IC die, wherein the pair of shunt resistor contacts are externally contactable through the mold encapsulation.

In some examples, the TCR of the temperature compensation resistor differs from the TCR of the shunt resistor by less than 1%.

In some examples, the IC die is solder bonded to the shunt resistor at a pair of spaced apart locations on the shunt resistor.

In some examples, the current sense circuitry in the IC die comprises a current sense amplifier to provide a current sense voltage at the external contact element, the current sense voltage representing a current across the shunt resistor.

In some examples, the temperature compensation resistor comprises a gain setting resistor to influence a gain of the current sense amplifier.

In some examples, the shunt resistor element has a first side and a second side opposite the first side, the IC die is connected to the shunt resistor on the first side of the shunt resistor element, and respective surfaces of the pair of shunt resistor contacts on the second side of the shunt resistor element are exposed through the mold encapsulation.

In some examples, the integrated shunt resistor element and the external contact element comprises components of a partial leadframe.

One aspect provides an electronic device including an electronic device substrate, electronic circuitry provided on the electronic device substrate, the electronic circuitry comprising a pair of monitored nodes, and an IC package mounted on the electronic device substrate. The IC package includes a partial leadframe including a shunt resistor leadframe element including (a) a pair of shunt resistor contacts conductively connected to the pair of monitored nodes, and (b) a shunt resistor conductively connected between the pair of shunt resistor contacts. A mold encapsulation is formed over the shunt resistor leadframe element.

In some examples, the partial leadframe includes at least one external contact leadframe element separate from the shunt resistor leadframe element, and the IC package includes an IC die connected to the shunt resistor leadframe element and connected to the at least one external contact leadframe element, the IC die comprising current sense circuitry to provide a current sense voltage at a respective external contact leadframe element of the at least one external contact leadframe element, the current sense voltage representing a current through the shunt resistor.

In some examples, the current sense circuitry in the IC die comprises a temperature compensation resistor, wherein a TCR of the temperature compensation resistor differs from a TCR of the shunt resistor by less than 5%.

In some examples, the current sense circuitry in the IC die comprises a current sense amplifier including (a) a current sense amplifier to provide the current sense voltage at a respective external contact leadframe element of the at least one external contact leadframe element, and (b) a gain setting and temperature compensation resistor, the gain setting and temperature compensation resistor to influence a gain of the current sense amplifier and compensate for temperature variations of the shunt resistor.

One aspect provides a method of forming an electronic device. The method includes forming an IC package by a process including: mounting an IC die to a leadframe, the IC die including current sense circuitry; wherein the leadframe includes a leadframe carrier structure and a shunt resistor leadframe element extending from the leadframe carrier structure, the shunt resistor leadframe element including a shunt resistor conductively connected between a pair of shunt resistor contacts; wherein mounting the IC die to the leadframe connects the current sense circuitry in the IC die to the pair of shunt resistor contacts; forming a mold encapsulation over the shunt resistor leadframe element and over the IC die, wherein the pair of shunt resistor contacts are externally contactable through the mold encapsulation; and cutting away the leadframe carrier structure.

In some examples, the method includes mounting the IC package on an electronic device substrate, wherein the pair of shunt resistor contacts are conductively connected to electronic circuitry provided on the electronic device substrate.

In some examples, the current sense circuitry in the IC die comprises a temperature compensation resistor, wherein a TCR of the temperature compensation resistor differs from a TCR of the shunt resistor by less than 5%.

In some examples, the leadframe includes at least one external contact leadframe element extending from the leadframe carrier structure, and mounting the IC die to the leadframe resistor comprises connecting the IC die to the at least one external contact leadframe element, wherein the current sense circuitry comprises a current sense amplifier to provide a current sense voltage at a respective external contact leadframe element of the at least one external contact leadframe element.

In some examples, mounting the IC die to the leadframe resistor comprises ball-down solder bonding the IC die to the shunt resistor at a pair of spaced apart locations on the shunt resistor.

BRIEF DESCRIPTION OF THE DRAWINGS

Example aspects of the present disclosure are described below in conjunction with the figures, in which:

FIGS. 2A-2E show an example electronic device including the example IC package shown in FIGS. 1A-1E discussed above mounted to an electronic device substrate;

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

The present disclosure provides an IC current sense package having an integrated shunt resistor and, optionally, an IC die including current sense circuitry to sense a current through the integrated shunt resistor. In some examples, the integrated shunt resistor is formed as a component of a leadframe. For example, the IC die may be mounted on a leadframe (e.g., a QFN leadframe) including (a) a leadframe carrier structure, (b) an integrated shunt resistor and (c) at least one external contact leadframe element extending from the leadframe carrier structure. The leadframe and IC die may be covered by a mold encapsulation, and the leadframe carrier structure may be removed by a cutting process, defining an IC current sense package including the integrated shunt resistor (having the IC die mounted thereon) and the at least one external contact leadframe element.

The current sense circuitry of the IC die may include a current sense amplifier and (in some examples) a temperature compensation resistor having a same or similar temperature coefficient of resistance (TCR) as the integrated shunt resistor (e.g., differing by less than 10%, less than 5%, or less than 1%, depending on the particular example). In some examples, the temperature compensation resistor may be formed from the same material as the integrated shunt resistor, e.g., pure copper.

In some examples, the IC current sense package may provide a relatively high accuracy, e.g., having an accuracy of at least 95% or in some examples, at least 99%, over a normal range of operating temperatures (e.g., over the range of −50° C. to +125° C.). In some examples, the IC current sense package may be a 30 A current sensor constructed as 3×3 QFN package. In some examples, the integrated shunt resistor is formed from pure copper, having a relatively low TCR. In some examples the integrated shunt resistor may have a resistance in the range of 250-750 micro-ohms (μΩ) (e.g., in the range of 400-600μΩ for a current of 20 Amperes (A)).

Figure 1A:
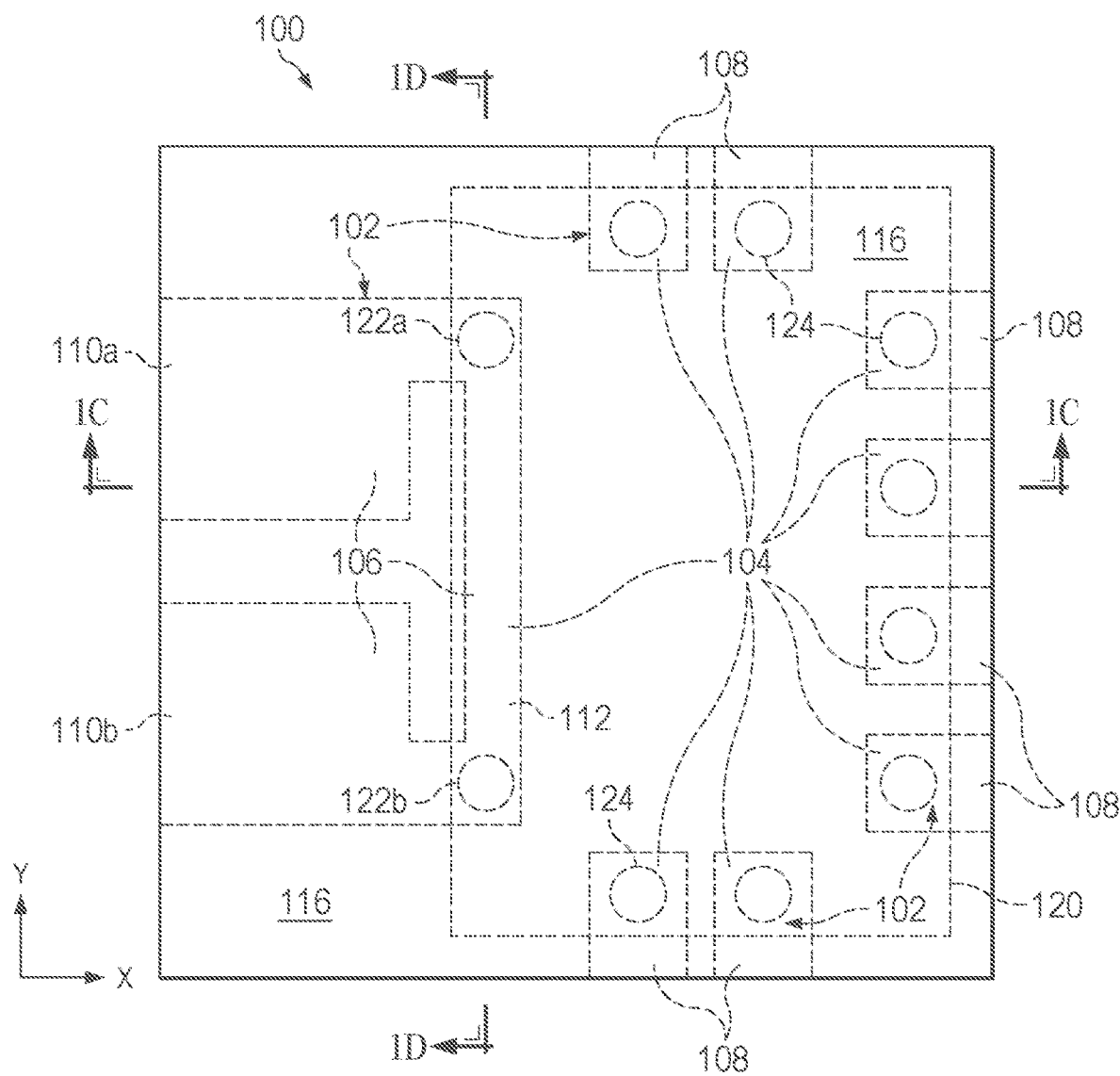
FIGS. 1A-1E show an example IC package including a partial leadframe including a shunt resistor leadframe element.
Figure 1B:
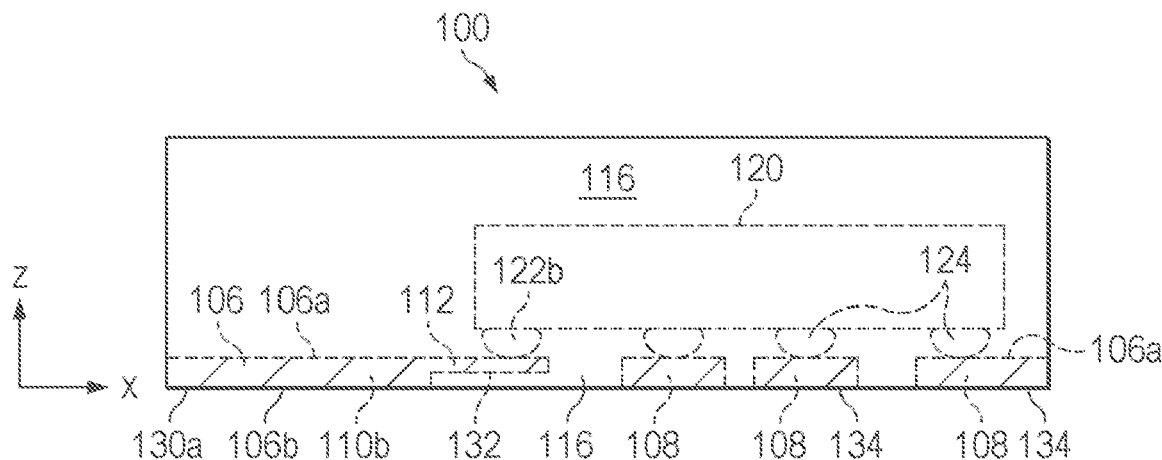
Figure 1C:
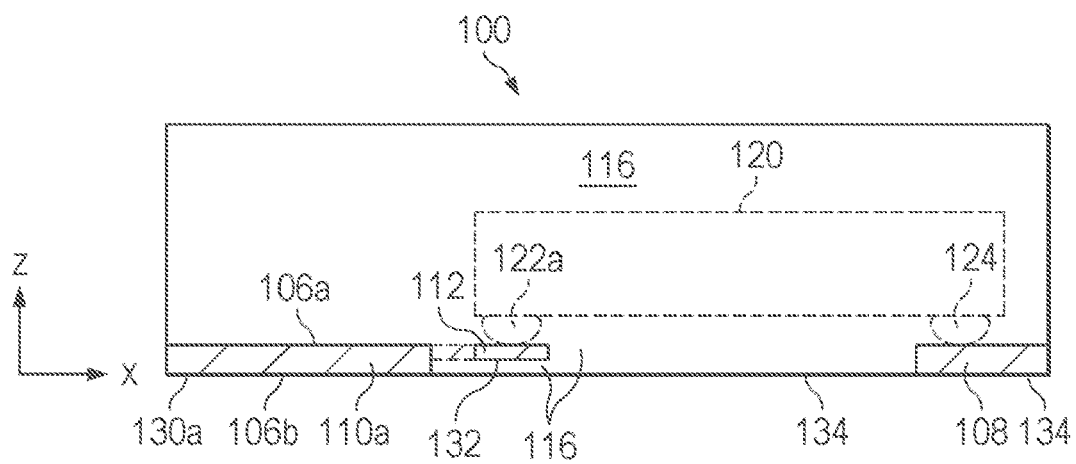
Figure 1D:
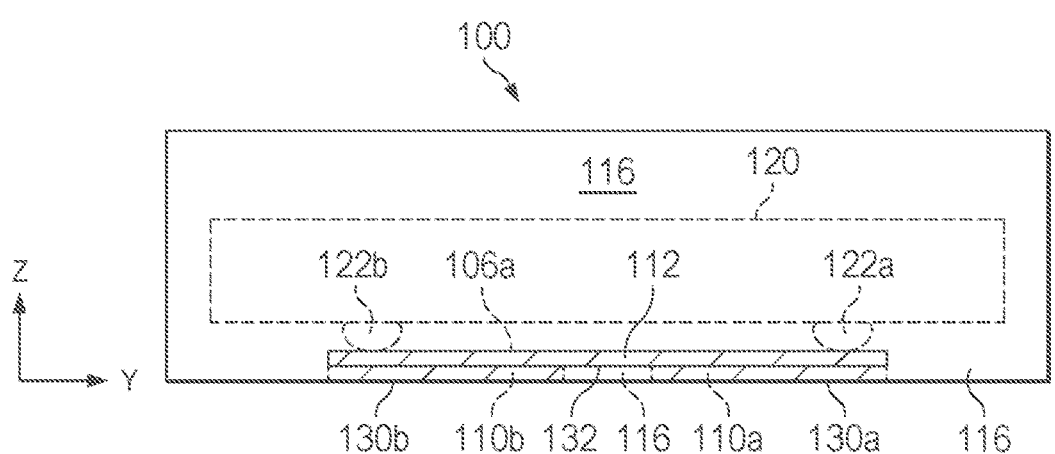
Figure 1E:
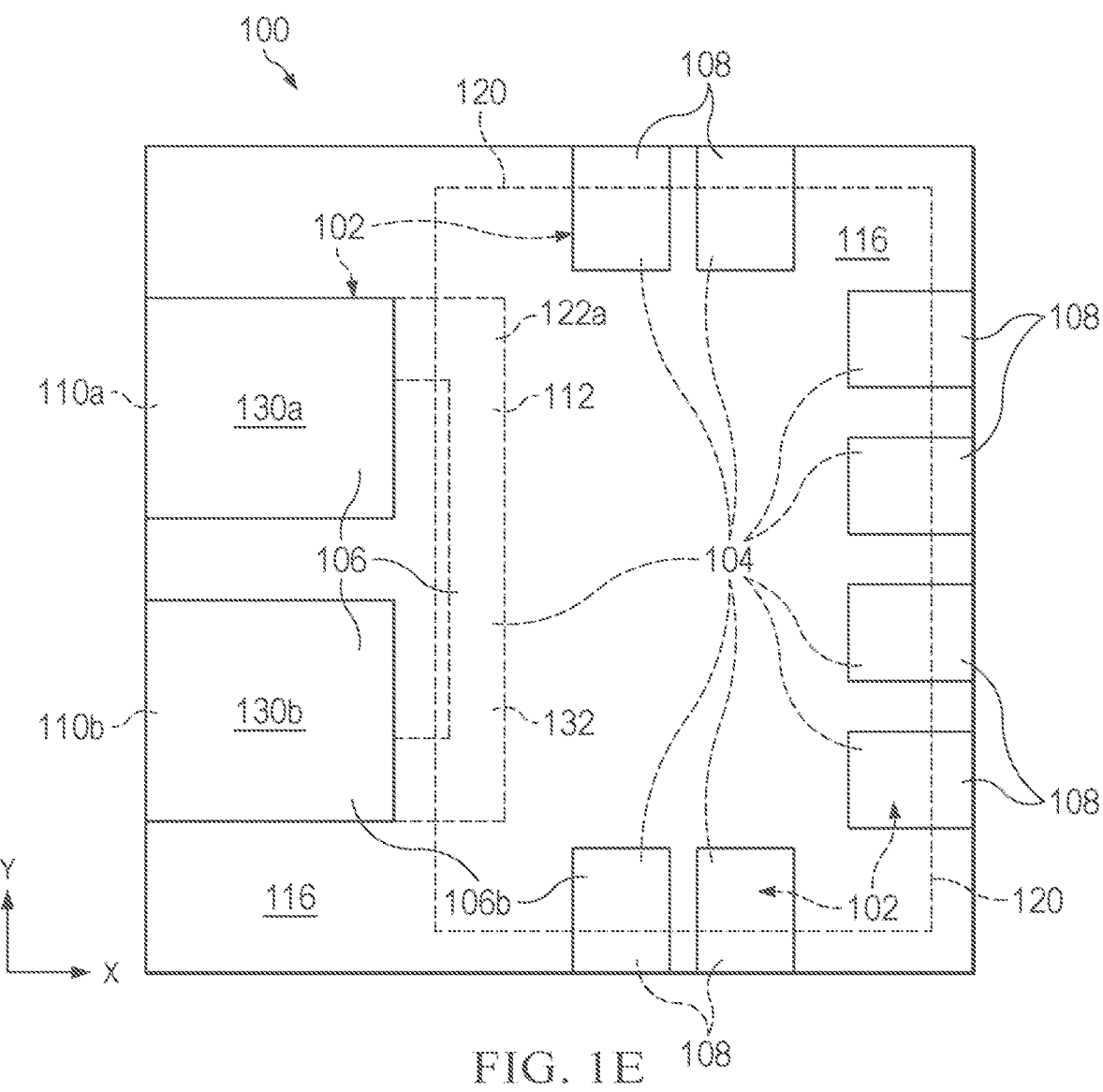

FIGS. 1A-1E show an example IC current sense package 100 (or simply, IC package 100, for convenience) according to one example. FIG. 1A shows a top view, FIG. 1B shows a side view along the y-axis direction, FIG. 1C shows a cross-sectional side view through line 1C-1C in FIG. 1A, FIG. 1D shows a cross-sectional side view through line 1D-1D in FIG. 1A, and FIG. 1E shows a bottom view of the example IC package 100. It should be understood that directional terms including "top" and "bottom" used herein are relative (not fixed) terms dependent on the respective physical orientation of the relevant element (e.g., the respective physical orientation of the example IC package 100).

In some examples, the example IC package 100 comprises a quad flat, no leads (QFN) package or other flat, no leads package, e.g., for mounting to an electronic device substrate (e.g., a printed circuit board (PCB)) or other electronic device, for example as discussed below with reference to FIGS. 2A-2E.

As shown in FIGS. 1A-1E, the example IC package 100 includes a partial leadframe 102 including multiple leadframe elements 104 comprising respective components of a leadframe, as discussed below. The multiple leadframe elements 104 include a shunt resistor leadframe element 106 and at least one external contact leadframe element 108 separate from the shunt resistor leadframe element 106. In this example, the partial leadframe 102 includes multiple external contact leadframe elements 108 (e.g., pins or leads) generally arranged around a perimeter of the IC package 100.

As used herein, a "partial leadframe" refers to a set of one or more components of a leadframe (referred to herein as leadframe elements), for example a set of leadframe elements remaining after removing other portions of a leadframe. For example, the partial leadframe 102 shown in FIGS. 1A-1E (also shown in FIGS. 2A-2E) includes multiple leadframe elements 104 comprising components of a common (same) leadframe, e.g., wherein formation of the example IC package 100 involves providing a leadframe (e.g., leadframe 300 shown in FIG. 3, discussed below) and subsequently removing portions of the leadframe (e.g., removing a leadframe carrier structure from the multiple leadframe elements 104), leaving the multiple leadframe elements 104 in the IC package 100. In some examples, the partial leadframe 102 may extend in a common plane (in some examples with the exception of any partially etched portions of the partial leadframe 102), for example where the partial leadframe 102 is formed from a planar leadframe.

In some examples, the partial leadframe 102 is formed from a metal having a TCR of less than 0.5%/° C. (5,000 ppm/° C.). For example, the partial leadframe 102 may be formed from pure copper, having a TCR of 0.39%/° C., wherein pure copper is defined as having a minimum copper content of 99.3%. In other examples, the partial leadframe 102 may be formed from a copper alloy, manganin, or other low TCR alloy. For example, in some examples the partial leadframe 102 may be formed from a copper alloy having a copper content of at least 90%, at least 95%, or at least 99%.

In some examples, the partial leadframe 102 is formed from a metal having a TCR of less than 0.035%/° C. (350 ppm/° C.). For example, the partial leadframe 102 may be formed from manganin (copper alloyed with manganese), or cupronickel (copper alloyed with nickel).

In some examples the integrated shunt resistor may have a resistance in the range of 50-1000μΩ, or in the range of 250-750μΩ. In one example, the integrated shunt resistor has a resistance in the range of 400-600μΩ for a current of 20 A.

The shunt resistor leadframe element 106 includes a pair of shunt resistor contacts 110a and 110b and a shunt resistor 112 conductively connected between the pair of shunt resistor contacts 110a, 110b (shunt resistor contacts 110a, 110b also referred to as shunt solder pads in some examples). The shunt resistor 112 may be referred to as an "integrated shunt resistor 112," as it is formed in (integrated in) the IC package 100.

The pair of shunt resistor contacts 110a, 110b may be connected to a pair of measurement nodes along a monitored conductive path (e.g., provided on an electronic device substrate (e.g., a PCB) or other device external to the IC package 100) to detect a current through the monitored conductive path, as discussed below with reference to FIGS. 2A-2E. The shape of the shunt resistor leadframe element 106 shown in FIGS. 1A-1E is one example only; the shunt resistor leadframe element 106, and the shunt resistor 112 defined by the shunt resistor leadframe element 106, may have any suitable shape and size. FIGS. 4A-4D discussed below illustrate four example partial leadframes including four example shunt resistor leadframe elements with different shapes.

In some examples, an optional IC die 120 may be mounted to the partial leadframe 102. For example, the optional IC die 120 may be solder bonded (e.g., ball-down bonded) to (a) the shunt resistor 112 by respective solder bonds (e.g., solder bumps or balls) 122a and 122b, and (b) respective external contact leadframe elements 108, e.g., by respective solder bonds (e.g., solder bumps or balls) 124.

As discussed below with reference to FIGS. 2A-2C, the optional IC die 120 may include current sense circuitry to sense a current through the shunt resistor 112. In some examples, as discussed below, such current sense circuitry provided in the optional IC die 120 may include a current sense amplifier to sense a volage across the shunt resistor 112, which voltage represents a current through the shunt resistor 112, which in turn represents a current through a monitored conductive path to which the shunt resistor contacts 110a and 110b may be connected. The current sense circuitry provided in the optional IC die 120 may also include a temperature compensation resistor to compensate for temperature variations in the shunt resistor 112, as discussed below in more detail. In other examples, e.g., certain examples in which the shunt resistor 112 is formed from a material having a very low TCR (e.g., manganin, cupronickel, or pure copper), the current sense circuitry may omit a temperature compensation resistor (e.g., a resistor having a same or similar TCR as the integrated shunt resistor).

A mold encapsulation 116 is formed over the shunt resistor leadframe element 106 and the (optional) IC die 120. As used herein, mold encapsulation "formed over" an element means mold encapsulation at least partially surrounding or enclosing the element, for example wherein the mold encapsulation covers one, multiple, or all sides or surfaces of the element (e.g., covering one, multiple, or all surfaces of the element that would otherwise be exposed in the absence of the mold encapsulation). The mold encapsulation 116 may comprise an epoxy, a polymer, or other suitable insulating material.

The external contact leadframe elements 108 and the pair of shunt resistor contacts 110a and 110b may be externally contactable through the mold encapsulation 116, e.g., for electrical connection to respective traces or other conductive elements provided on an electronic device substrate (e.g., a PCB) or other device external to the IC package 100. For example, respective external contact leadframe elements 108 and the pair of shunt resistor contacts 110a and 110b may be exposed through the mold encapsulation 116, allowing external contact to the external contact leadframe elements 108 and shunt resistor contacts 110a and 110b. In some examples, the shunt resistor leadframe element 106 is partially exposed through the mold encapsulation 116, wherein the pair of shunt resistor contacts 110a and 110b are exposed through the mold encapsulation 116, while the shunt resistor 112 is fully encapsulated (i.e., not exposed through the mold encapsulation 116). As shown in FIGS. 1B and 1C, the shunt resistor 112 may be etched back to reduce a thickness (in the z-direction) of the shunt resistor 112 relative to the shunt resistor contacts 110a and 110b, and the etched-back outer surface of the shunt resistor 112, indicated at 132, may be covered by mold encapsulation 116, for example to protect the shunt resistor 112 from external exposure or directed contact to the shunt resistor 112 (e.g., to prevent an electrical short or other unwanted effects).

In the illustrated example, the shunt resistor leadframe element 106 has a first side 106a (e.g., top side in the illustrated orientation) and a second side 106b (bottom side in the illustrated orientation) opposite the first side 106a. As shown in FIGS. 1B and 1C, the optional IC die 120 may be connected to the shunt resistor 112 on the first side 106a of the shunt resistor leadframe element 106, and respective surfaces 130a, 130b of the pair of shunt resistor contacts 110a, 110b on the second side 106b of the shunt resistor leadframe element 106 may be exposed through the mold encapsulation 116, while the etched-back outer surface 132 of the shunt resistor 112 may be covered by mold encapsulation 116, as discussed above. Also shown in FIGS. 1B and 1C, respective outer surfaces 134 of respective external contact leadframe elements 108 may be exposed through the mold encapsulation 116, e.g., to allow solder bonding of the external contact leadframe elements 108 to respective conductive elements.

Figure 2A:
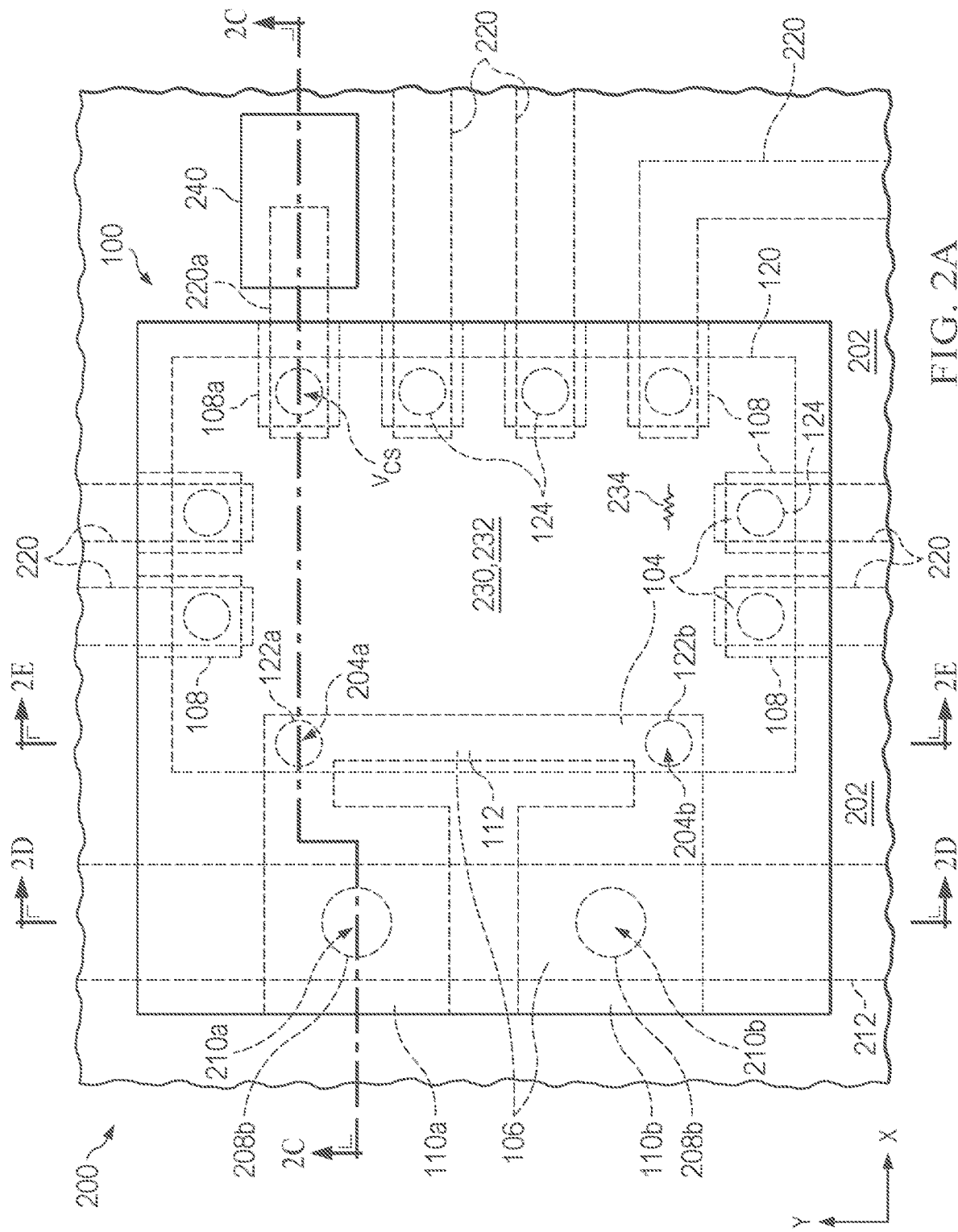
Figure 2D:
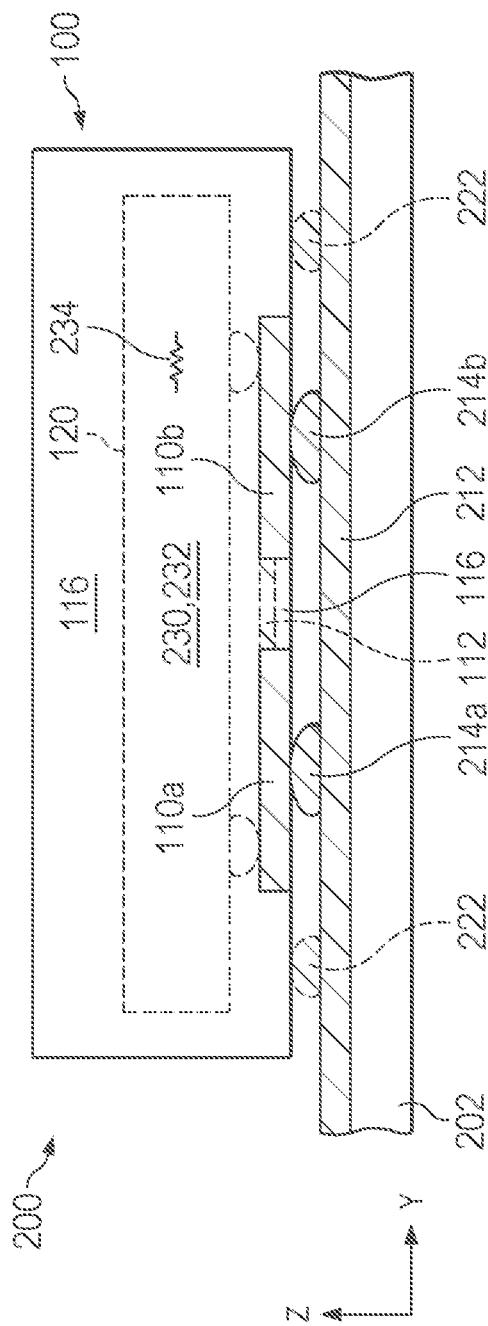
Figure 2E:
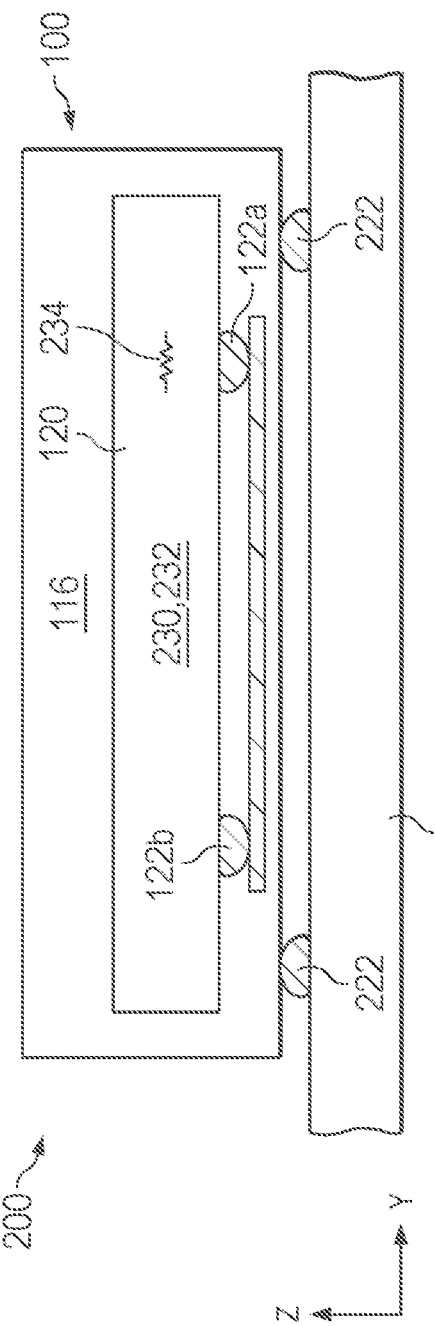

FIGS. 2A-2E show an example electronic device 200 including the example IC package 100 (shown in FIGS. 1A-1E discussed above) mounted to an electronic device substrate 202, e.g., a PCB. FIG. 2A shows a top view, FIG. 2B shows a side view along the y-axis direction, FIG. 2C shows a cross-sectional side view through line 2C-2C in FIG. 2A, FIG. 2D shows a cross-sectional side view through line 2D-2D in FIG. 2A, and FIG. 2E shows a cross-sectional side view through line 2E-2E in FIG. 2A.

In this example the IC package 100 includes the optional IC die 120 discussed above. The IC die 120 may be solder bonded (e.g., ball-down bonded) to the top side of the shunt resistor 112 at a pair of spaced apart locations 204a, 204b on the shunt resistor 112, as indicated by respective solder bonds (e.g., ball-down solder bonds) 122a and 122b. The IC die 120 may also be solder bonded (e.g., ball-down bonded) to respective external contact leadframe elements 108, as indicated by respective solder bonds (e.g., ball-down solder bonds) 124. The spaced-apart locations 204a, 204b may be spaced apart (in the y-direction) by a defined distance, e.g., which distance may be defined by interconnection requirements and/or relevant IC die dimensions for the respective electronic device.

The IC package 100 may be mounted to an electronic device substrate 202, e.g., a PCB, by solder mounting or any other suitable mounting. For example, respective surfaces 130a, 130b of the shunt resistor contacts 110a and 110b may be solder bonded to a pair of monitored nodes 210a, 210b along a monitored conductive path 212 by respective solder bonds 214a and 214b. The monitored conductive path 212 may comprise a metal trace or other current-carrying element formed or otherwise provided on the electronic device substrate 202. In addition, a respective outer surface 134 of respective external contact leadframe elements 108 may be solder bonded to respective conductive elements (e.g., metal traces) 220 by respective solder bonds 222.

Figure 5A:
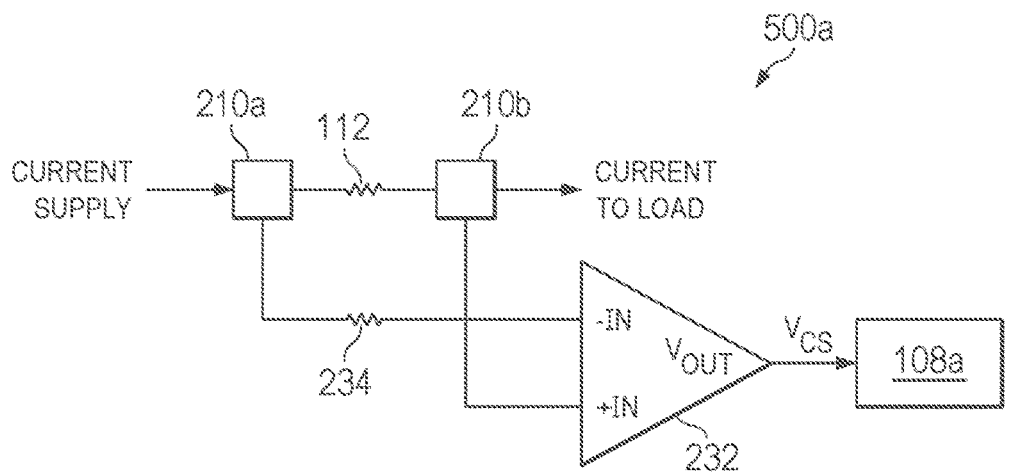
FIGS. 5A, 5B, and 5C show example circuit schematics showing examples of the current sense circuitry provided in the optional IC die of the example IC package shown in FIGS. 1A-1E.
Figure 5B:
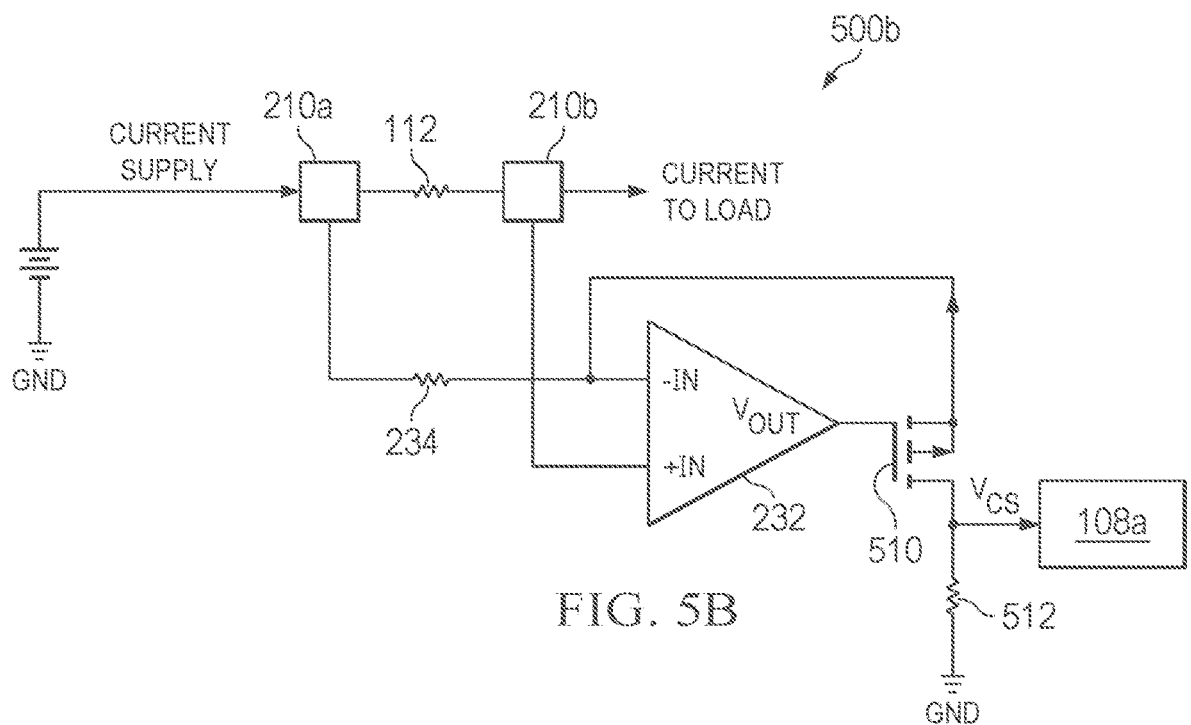
Figure 5C:
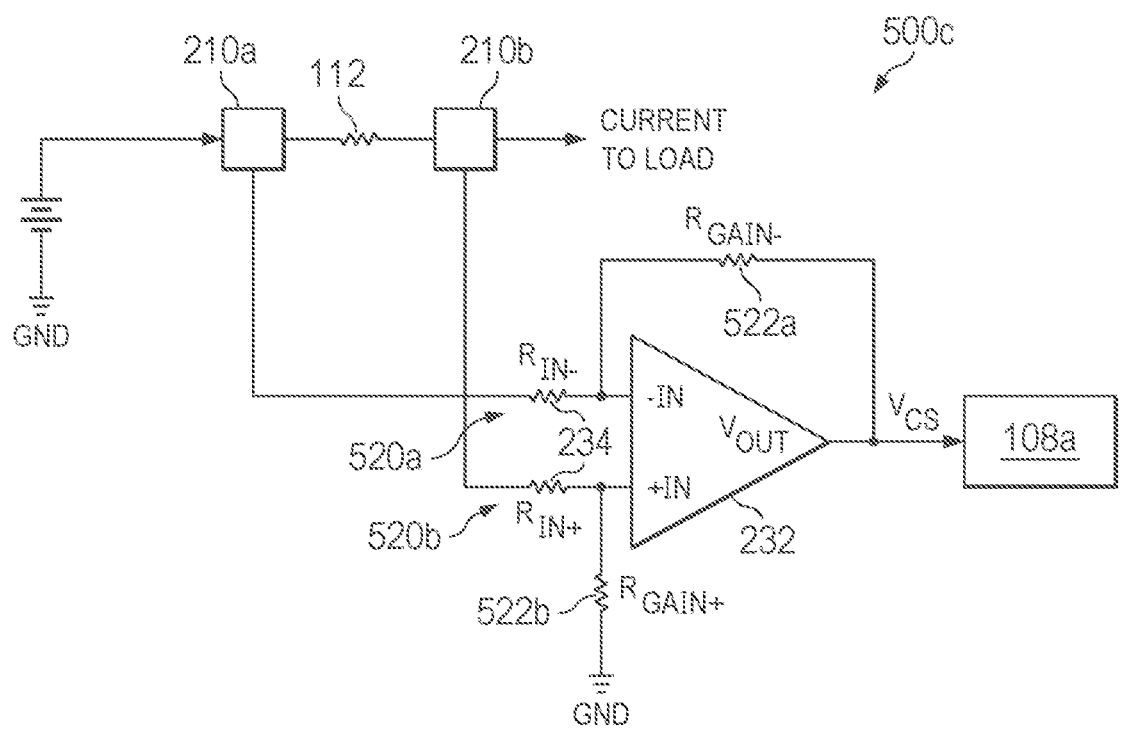

The IC die 120 may include current sense circuitry 230 to sense a current through the shunt resistor 112, to thereby sense a related current through the conductive path 212. In some examples, the current sense circuitry 230 may include (a) a current sense amplifier 232 to sense a volage across the shunt resistor 112 and (b) temperature compensation resistor 234 to compensate for temperature variations in the shunt resistor 112. The volage sensed by the current sense amplifier 232 (i.e., the voltage) across the shunt resistor 112 represents a current through the shunt resistor 112, which in turn represents a current through the monitored conductive path 212 (between the monitored nodes 210a, 210b) to which the shunt resistor contacts 110a and 110b are connected (e.g., by solder bonds 214a and 214b, respectively). FIGS. 5A-5C discussed below provide example circuit schematics of current sense circuitry 230.

In some examples, the current sense circuitry 230 includes a current sense amplifier 232 to sense a volage across the shunt resistor 112 and provide an amplified voltage, referred to herein as a current sense voltage ($V_{CS}$), at one of the external contact leadframe elements 108, referred to as an amplifier output contact 108a. As shown in FIGS. 2A-2C, the amplifier output contact 108a may be connected to measurement circuitry 240 via a conductive element 220a (e.g., metal trace), e.g., to calculate or otherwise determine the current through the monitored conductive path 212 based on the current sense voltage $V_{CS}$ provided by the current sense amplifier 232.

The temperature compensation resistor 234 may have the same or similar temperature coefficient of resistance (TCR) as the shunt resistor 112. For example, a $TCR_{R234}$ of the temperature compensation resistor 234 may differ from a $TCR_{R112}$ of the shunt resistor 112 by less than 10%, or in some examples, by less than 5%. In particular examples, the $TCR_{R234}$ of the temperature compensation resistor 234 differs from the $TCR_{R112}$ of the shunt resistor 112 by less than 1%. For example, the temperature compensation resistor 234 may be formed from the same material as the shunt resistor 112 or from a material having a similar TCR as the shunt resistor 112 (e.g., differing by less than 10%, less than 5%, or less than 1%, depending on the particular example). In one example, the shunt resistor 112 and the temperature compensation resistor 234 are both formed from pure copper. In some examples in which current sense circuitry 230 comprises a current sense amplifier 232, the temperature compensation resistor 234 may comprise a gain setting resistor to influence a gain of the current sense amplifier 232, wherein the temperature compensation resistor 234 provides two functions: (1) influence a gain of the current sense amplifier 232, and (2) compensate for temperature variations in the shunt resistor 112.

In other examples, the temperature compensation resistor 234 may be omitted, for example where the shunt resistor 112 is formed from a material exhibiting a very low TCR, e.g., manganin or cupronickel, or pure copper in some examples.

Other external contact leadframe elements 108 of the partial leadframe 102 (i.e., other than the amplifier output contact 108a) may comprise any type of pin, lead or other connection for communicating power and/or data signals to and/or from the IC die 120, e.g., via respective conductive elements (e.g., metal traces) 220. For example, one or more external contact leadframe elements 108 may comprise power connections for supplying power to the IC die 120 (e.g., a circuit ground, a negative power supply, and/or a positive power supply) and a plurality of signaling connections for communicating data between the IC die 120 and electronics external to the IC die 100, e.g., electronics formed or mounted on the electronic device substrate 202, for example a signal filter connection pin, an output quiescent level reference pin, one or more connections for an internal comparator circuitry (e.g., to detect over or under limit conditions), and/or one or more digital output pins.

Figure 3:
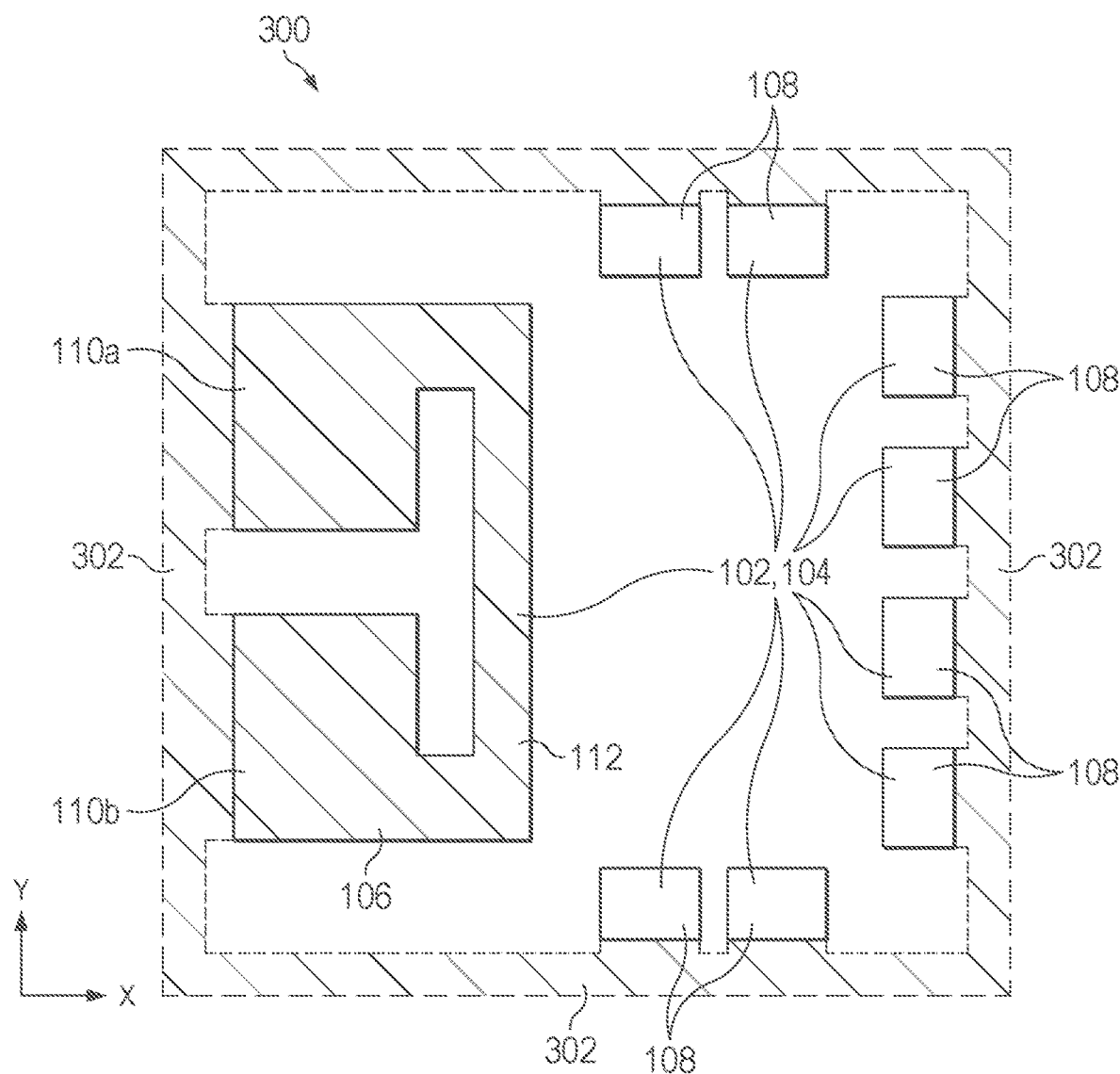
FIG. 3 shows an example leadframe in an intact state, which may be partially removed (e.g., partially cut away) to form the example partial leadframe shown in FIGS. 1A-1E.

FIG. 3 shows an example leadframe 300 in an intact state, which may be processed (partially removed) to form the example partial leadframe 102 shown in FIGS. 1A-1E and FIGS. 2A-2E. In some examples, the leadframe 300 may be a QFN leadframe. In some examples, the leadframe 300 may be formed from pure copper, manganin, cupronickel, or other copper alloy. The illustrated leadframe 300 includes (a) a leadframe carrier structure 302 and (b) the multiple leadframe elements 104 discussed above, including the shunt resistor leadframe element 106 (including shunt resistor contacts 110a and 110b and shunt resistor 112) and multiple external contact leadframe elements 108, extending from the leadframe carrier structure 302. In the illustrated example, the leadframe carrier structure 302 has a ring shape defining a leadframe carrier structure perimeter, and the multiple leadframe elements 104 extend inwardly from the leadframe carrier structure perimeter defined by the leadframe carrier structure 302. As shown, shunt resistor contacts 110a and 110b of the shunt resistor leadframe element 106 may be connected to the leadframe carrier structure 302.

Figure 7A:
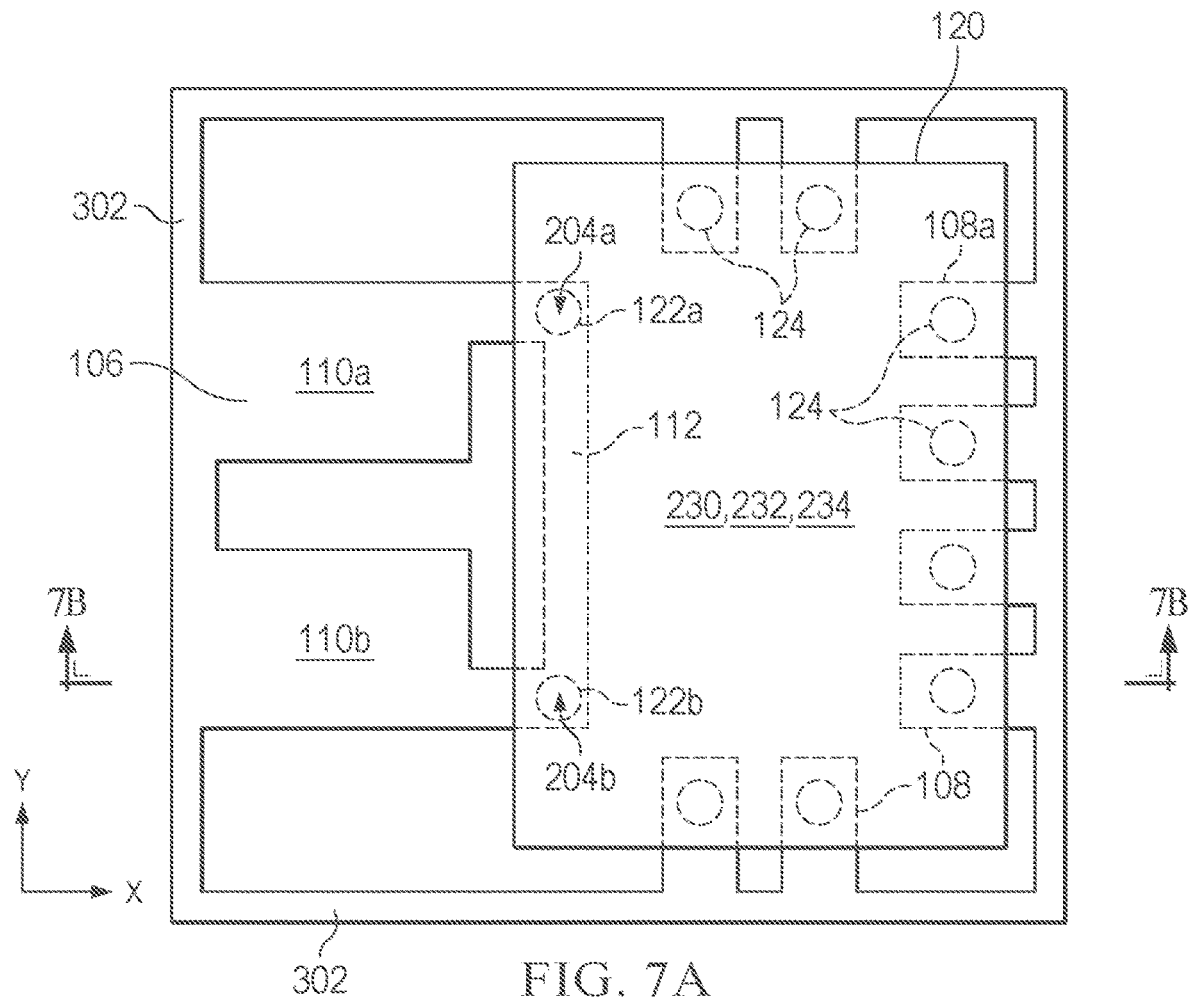
Figure 7B:
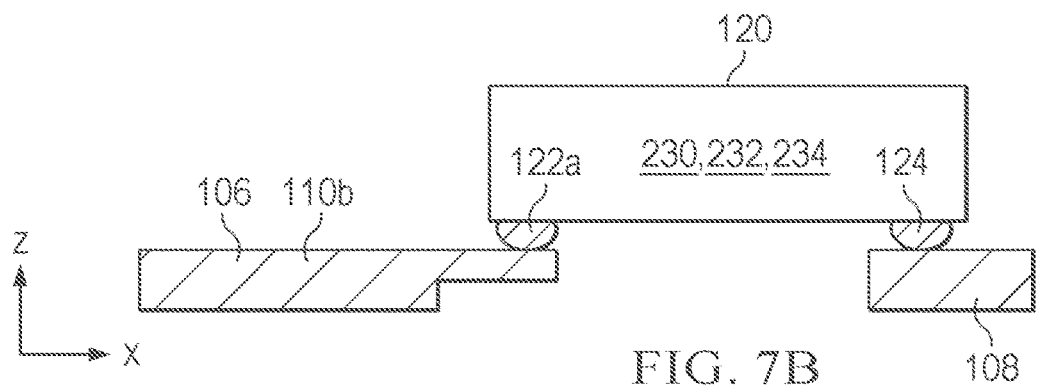

During an example formation of the example IC package 100, the optional IC die 120 may be mounted to the leadframe 300, e.g., as shown in FIGS. 7A-7B discussed below, for example by solder mounting respective contacts provided in the IC die 120 to respective shunt resistor contacts 110a and 110b and to respective external contact leadframe element 108). The leadframe carrier structure 302 may be subsequently removed (e.g., cut away), e.g., as shown in FIGS. 9A-10B discussed below, leaving the partial leadframe 102, including the shunt resistor leadframe element 106 and external contact leadframe elements 108.

Figure 4A:
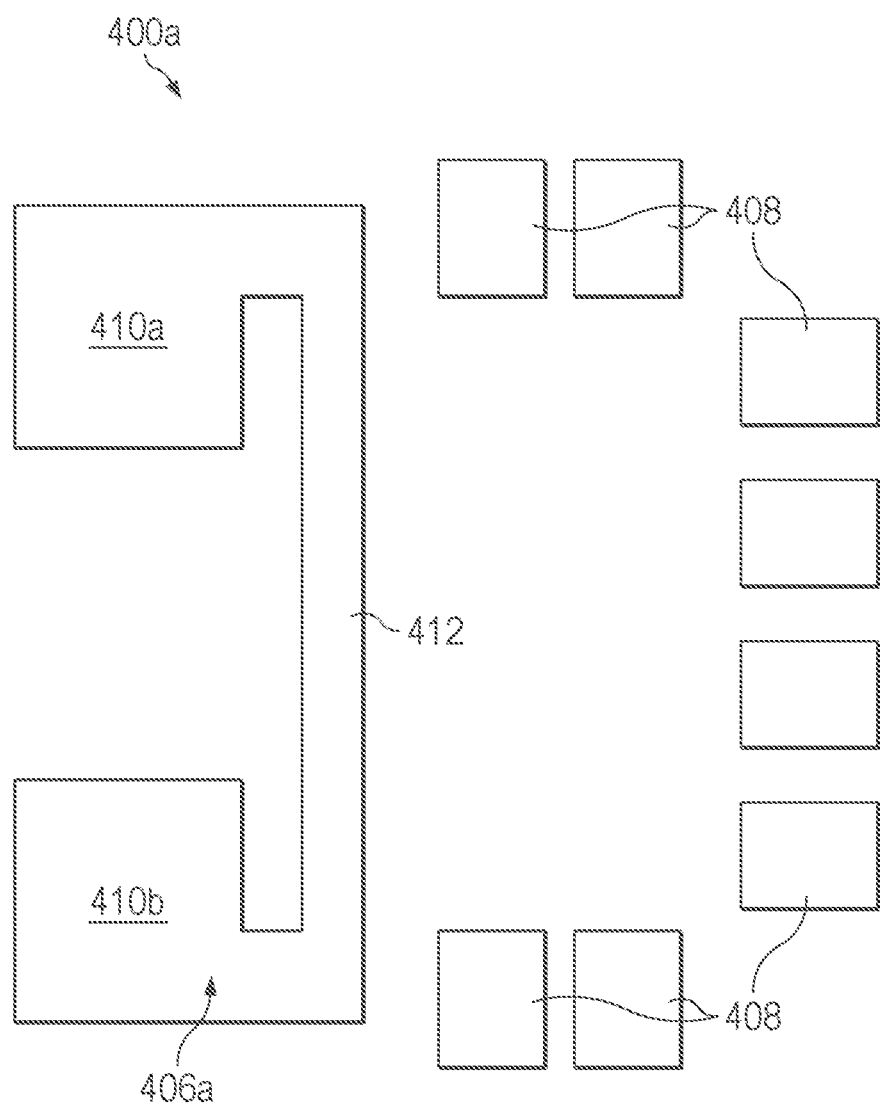
FIGS. 4A-4D illustrate four example partial leadframes having example shunt resistor leadframe elements with different example shapes, e.g., for use in the example IC package shown in FIGS. 1A-1E.
Figure 4B:
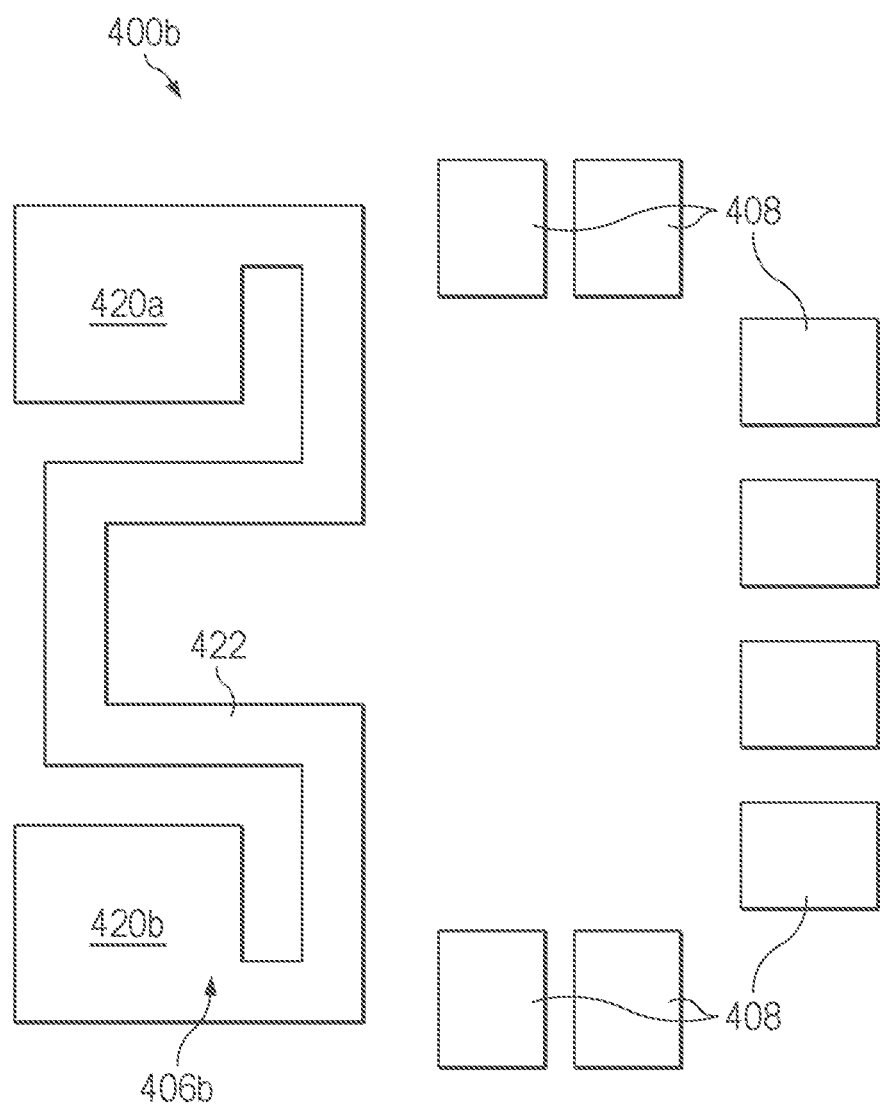
Figure 4C:
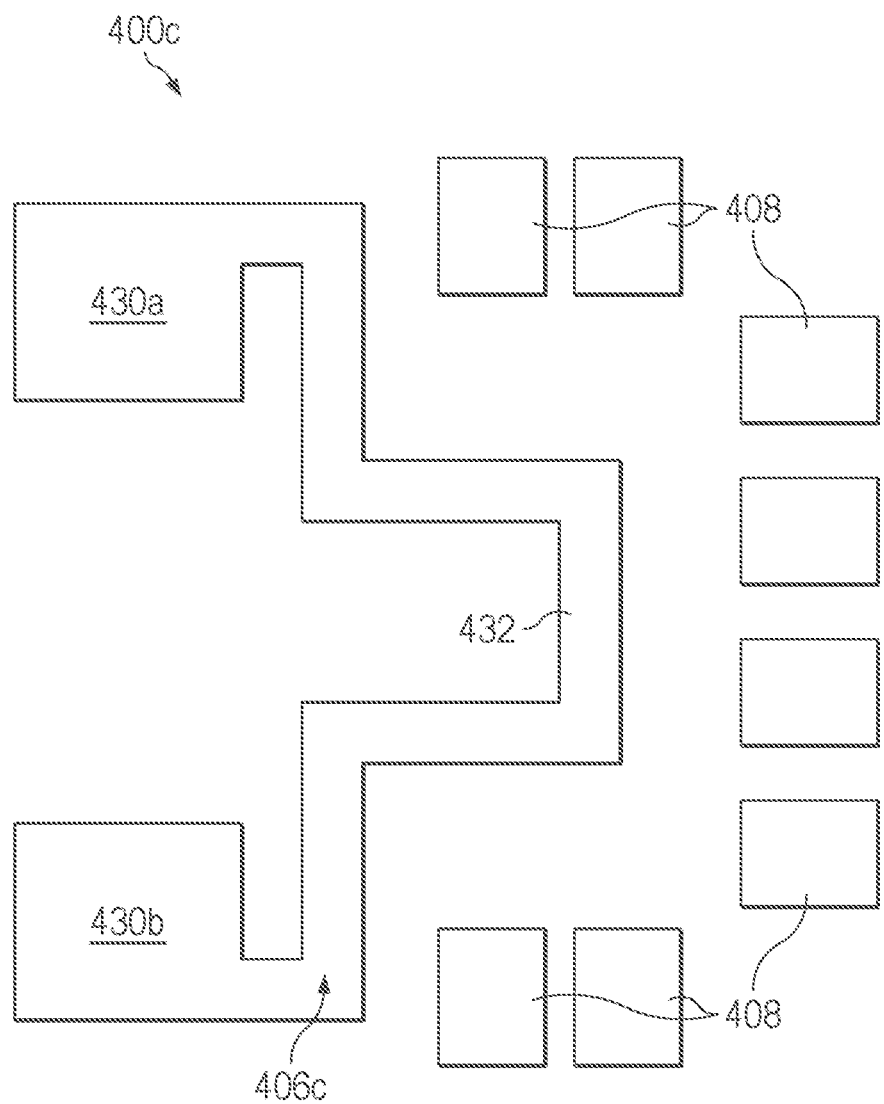
Figure 4D:
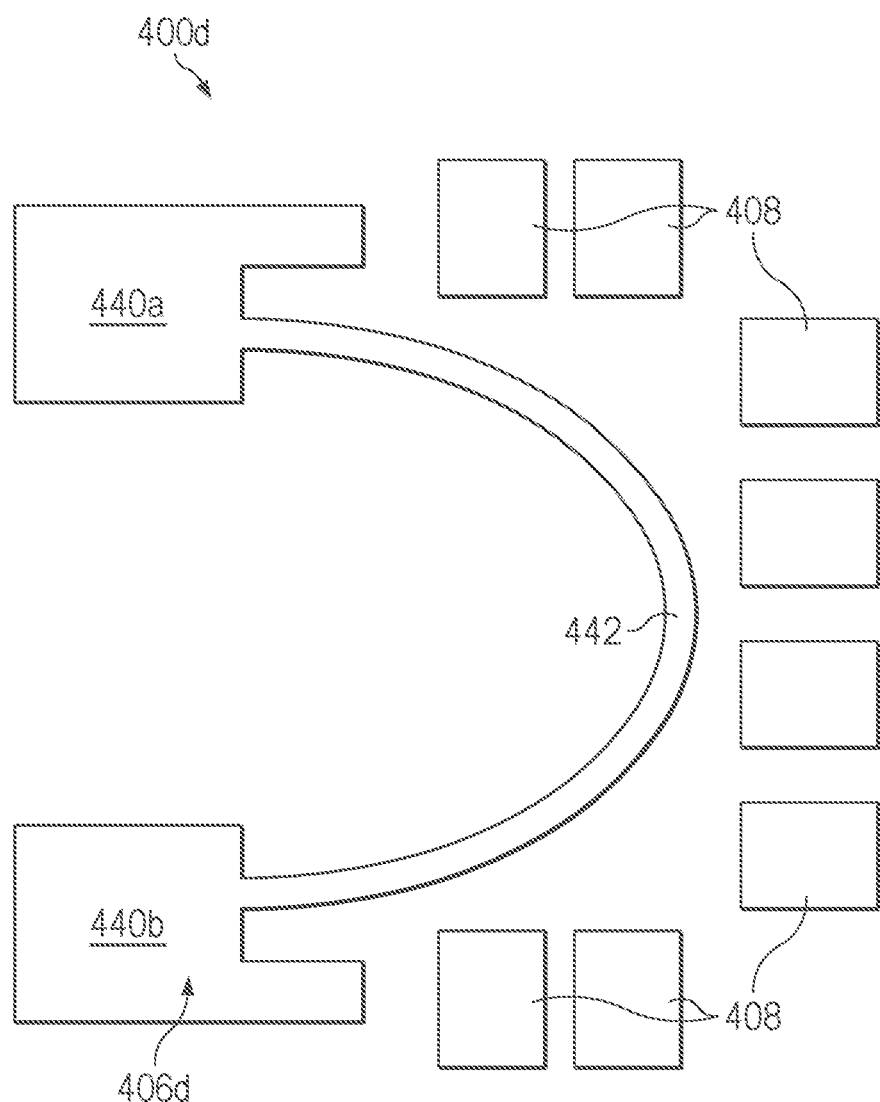

FIGS. 4A-4D illustrate four example partial leadframes 400a-400d having example shunt resistor leadframe elements 406a-406d, respectively, with different example shapes, e.g., for use in the example IC package 100 or similar IC package. As shown in FIG. 4A, example partial leadframe 400a includes (a) an example shunt resistor leadframe element 406a including an example shunt resistor 412 connected between a pair of shunt resistor contacts 410a and 410b, and (b) multiple external contact leadframe elements 408. As shown in FIG. 4B, example partial leadframe 400b includes (a) an example shunt resistor leadframe element 406b including an example shunt resistor 422 connected between a pair of shunt resistor contacts 420a and 420b, and (b) multiple external contact leadframe elements 408. As shown in FIG. 4C, example partial leadframe 400c includes (a) an example shunt resistor leadframe element 406c including an example shunt resistor 432 connected between a pair of shunt resistor contacts 430a and 430b, and (b) multiple external contact leadframe elements 408. As shown in FIG. 4D, example partial leadframe 400d includes (a) an example shunt resistor leadframe element 406d including an example shunt resistor 442 connected between a pair of shunt resistor contacts 440a and 440b, and (b) multiple external contact leadframe elements 408.

Each partial leadframe 400a-400d may comprise a portion of a respective leadframe, wherein another portion of the respective leadframe (e.g., a respective leadframe carrier structure) may be removed (e.g., cut away) during formation of a respective IC package, e.g., similar to the removal of the leadframe carrier structure 302 from the example leadframe 300 (leaving the partial leadframe 102) as discussed above.

FIGS. 5A, 5B, and 5C are example circuit schematics showing example current sense circuitries 500a, 500b, and 500c, respectively, representing examples of the current sense circuitry 230 provided in the optional IC die 120 of the example IC package 100. As shown in FIG. 5A, example current sense circuitry 500a may include (a) current sense amplifier 232 (operational amplifier) connected across the shunt resistor 112, in particular at monitored nodes 210a and 210b, and (b) temperature compensation resistor 234 arranged between the monitored node 210a and a corresponding input terminal of the current sense amplifier 232. In this example, the temperature compensation resistor 234 may (a) compensate for temperature variations in the shunt resistor 112 and (b) act as a gain setting resistor influencing a gain of the current sense amplifier 232. The current sense amplifier 232 provides an amplified voltage, or current sense voltage, $V_{CS}$, at an amplifier output contact 108a shown in FIGS. 2A-2C, as discussed above.

The example current sense circuitry 500a may include additional circuit components not shown in FIG. 5A, e.g., one or more additional temperature compensation resistor, gain setting resistor, transistor, and/or other circuit elements.

Next, as shown in FIG. 5B, example current sense circuitry 500b may include similar circuitry as current sense circuitry 500a (including current sense amplifier 232 connected across the shunt resistor 112 at monitored nodes 210a and 210b, and temperature compensation resistor 234), and additionally a transistor 510 and an amplifier load resistor 512. The current sense amplifier 232 provides an amplified voltage, or current sense voltage, $V_{CS}$, at an amplifier output contact 108a shown in FIGS. 2A-2C, as discussed above. The example current sense circuitry 500b may include additional circuit components not shown in FIG. 5B, e.g., one or more additional temperature compensation resistor, gain setting resistor, transistor, and/or other circuit elements.

Next, as shown in FIG. 5C, example current sense circuitry 500c may include (a) current sense amplifier 232 connected across the shunt resistor 112 at monitored nodes 210a and 210b, (b) a pair of input resistors 520a and 520b, and (c) a pair of gain resistors 522a and 522b. In this example, the input resistors 520a and 520b comprise temperature compensation resistors 234 to compensate for temperature variations in the shunt resistor 112. In this example the input is applied as a differential input (defined by a differential between resistors 520a and 520b) to the current sense amplifier (operational amplifier) 232 that functions as a difference amplifier, thereby providing an amplifier that can monitor and deliver an output signal (current sense voltage $V_{CS}$) indicating both the direction of current flow (indicated by the polarity of $V_{CS}$) and the magnitude of current flow (indicated by the magnitude of $V_{CS}$). The current sense voltage (amplified voltage) $V_{CS}$ is provided at the amplifier output contact 108a shown in FIGS. 2A-2C, as discussed above. The example current sense circuitry 500c may include additional circuit components not shown in FIG. 5C, e.g., one or more additional temperature compensation resistor, gain setting resistor, transistor, and/or other circuit elements.

Figure 6A:
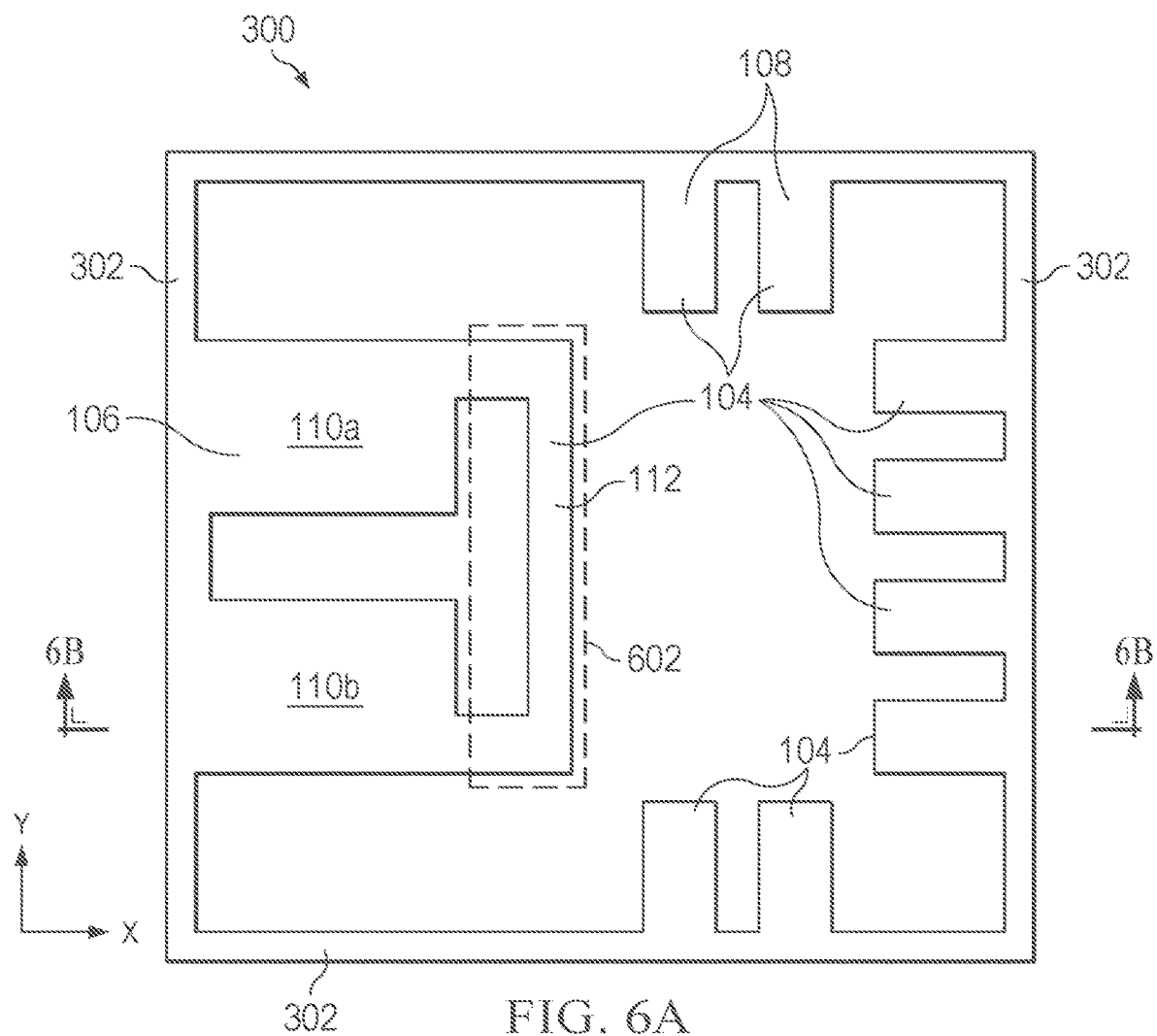
FIGS. 6A-6B, 7A-7B, 8A-8B, 9A-9B, and 10A-10B illustrate an example method of forming the example electronic device shown in FIGS. 2A-2E, including the example IC package shown in FIGS. 1A-1E.

FIGS. 6A-6B through FIGS. 10A-10B illustrate an example method of forming the example electronic device 200 shown in FIGS. 2A-2E. FIG. 6A (top view) and FIG. 6B (cross-sectional side view through line 6B-6B shown in FIG. 6A) show the example leadframe 300 shown in FIG. 3, including (a) the leadframe carrier structure 302 and (b) leadframe elements 104, including the shunt resistor leadframe element 106 and multiple external contact leadframe elements 108, extending inwardly from the leadframe carrier structure 302. As discussed above, the shunt resistor leadframe element 106 includes a shunt resistor 112 connected between shunt resistor contacts 110a and 110b.

Figure 6B:
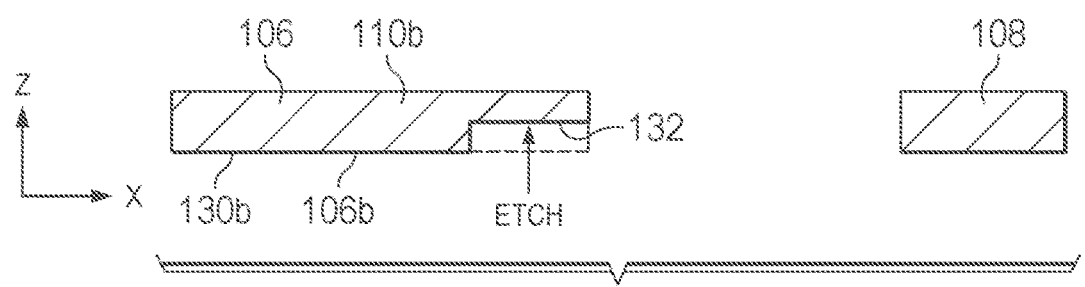

As shown in FIGS. 6A and 6B, an etch process may be performed on a selected area 602 of the second side 106b of the shunt resistor leadframe element 106 to selectively remove a partial thickness (in the z-direction) of the shunt resistor 112, while leaving a full thickness (in the z-direction) of the shunt resistor contacts 110a and 110b intact. Depending on the orientation of the leadframe 300, the second side 106b of the shunt resistor leadframe element 106 may be considered the back side of the leadframe 300, and the etch process may thus be referred to as a back etch. Accordingly, the back etch may define the etched-back outer surface 132 of the shunt resistor 112, in contrast with the unetched surfaces 130a, 130b of the shunt resistor contacts 110a, 110b. In other examples, the back etch process may be omitted.

As shown in FIG. 7A (top view) and FIG. 7B (cross-sectional side view through line 7B-7B shown in FIG. 7A), the optional IC die 120 may be mounted to the leadframe 300. As discussed above, the IC die 120 includes current sense circuitry 230, e.g., including a current sense amplifier 232 and at least one temperature compensation resistor 234. As shown in FIGS. 7A and 7B, the IC die 120 may be (a) solder bonded to the shunt resistor 112 at spaced-apart locations 204a and 204b by respective solder bonds (e.g., solder bumps or balls) 122a and 122b, and (b) solder bonded (e.g., ball-down bonded) to respective external contact leadframe elements 108 (including the amplifier output contact 108a) by respective solder bonds (e.g., solder bumps or balls) 124. Solder bonds 122a and 122b electrically connect the current sense circuitry 230 across the shunt resistor 112, and solder bonds 124 electrically connect respective elements of current sense circuitry 230 and/or other circuitry provided in the IC die 120 with respective external contact leadframe elements 108, including connecting an output of the current sense amplifier 232 with the amplifier output contact 108a.

Figure 8A:
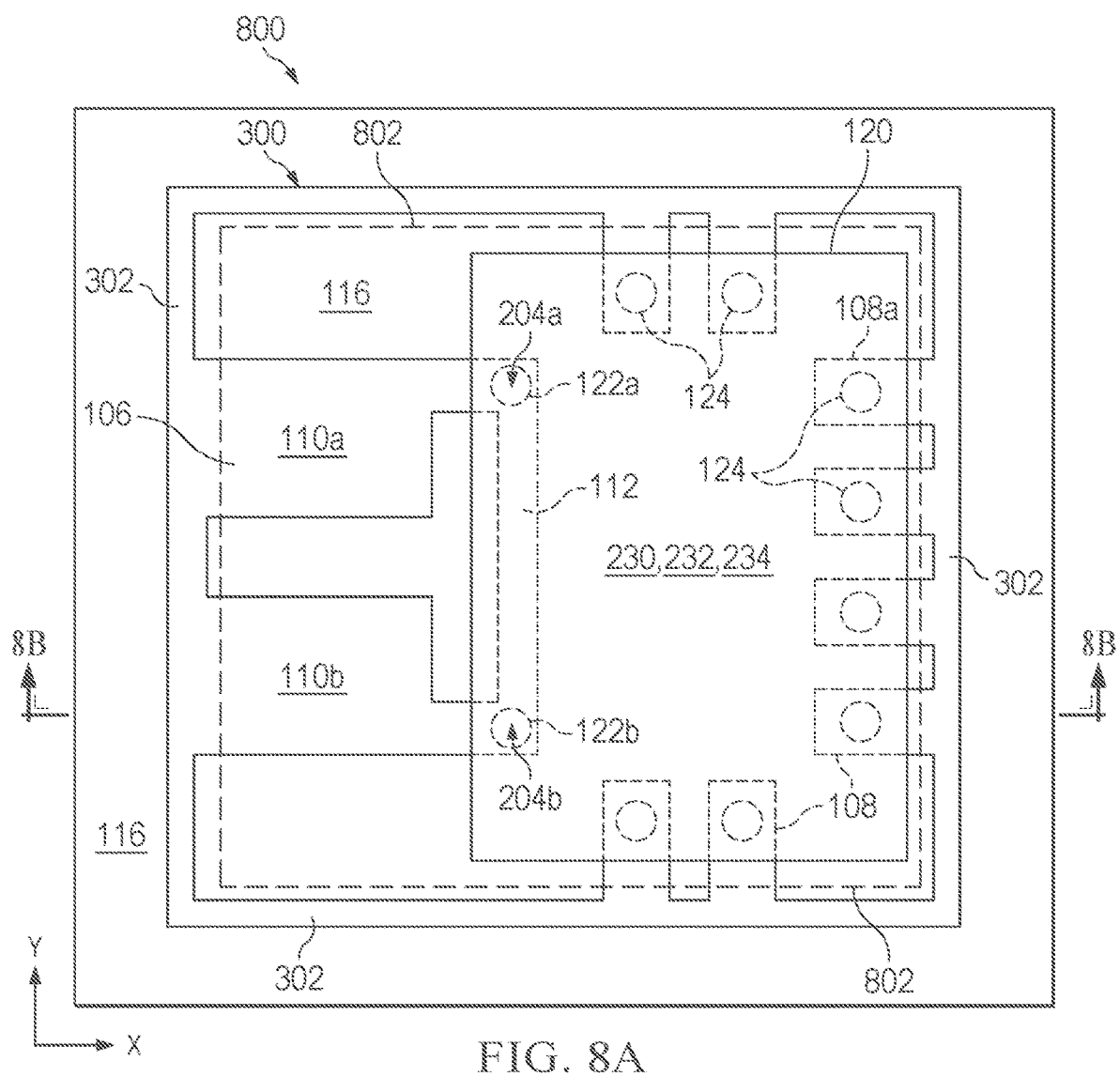
Figure 8B:
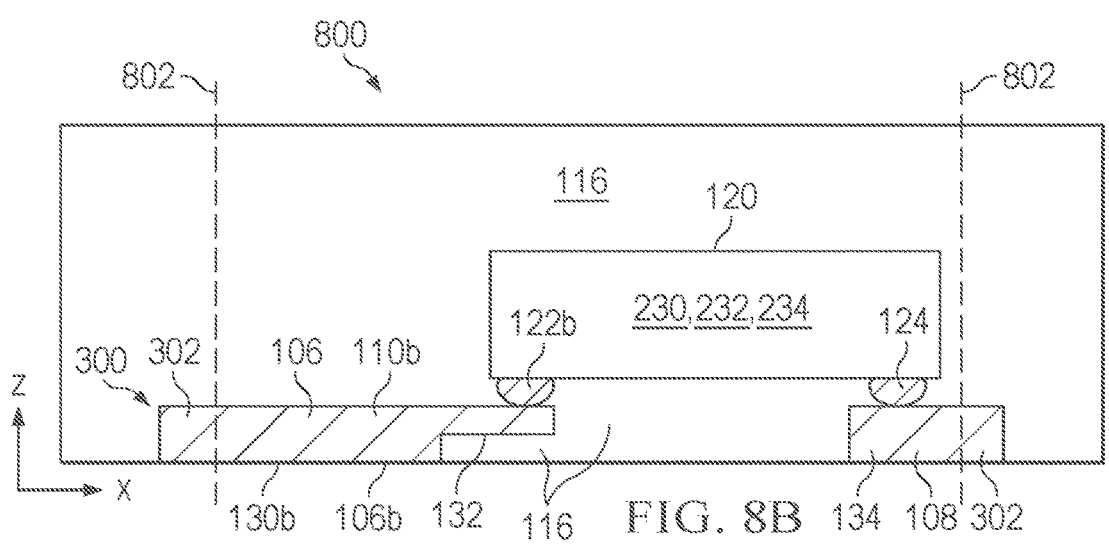

As shown in FIG. 8A (top view) and FIG. 8B (cross-sectional side view through line 8B-8B shown in FIG. 8A), the mold encapsulation 116 may be formed over the leadframe 300 and over the IC die 120, forming a mold encapsulated structure 800. As discussed above, the mold encapsulation 116 may comprise an epoxy, a polymer, or other suitable insulating material.

As shown in FIG. 8B, the mold encapsulation 116 may be formed co-planar with the second side 106b of the leadframe 300 (e.g., bottom side in the illustrated orientation), e.g., so that (a) the outer surfaces 130a, 130b of the shunt resistor contacts 110a, 110b and (b) the respective outer surfaces 134 of respective external contact leadframe elements 108 are exposed through the mold encapsulation 116, while the etched-back outer surface 132 of the shunt resistor 112 is covered by the mold encapsulation 116, e.g., to protect the shunt resistor 112 from unwanted effects. The respective locations of the outer surfaces 130a, 130b of both shunt resistor contacts 110a, 110b are shown in FIG. 1D, discussed above.

After forming the mold encapsulation 116, the leadframe carrier structure 302 may be cut away from the leadframe 300. For example, as shown in FIGS. 8A and 8B, the mold encapsulated structure 800 may be cut (in the z-direction) along the example cut line 802, and the leadframe carrier structure 302 removed.

Figure 9A:
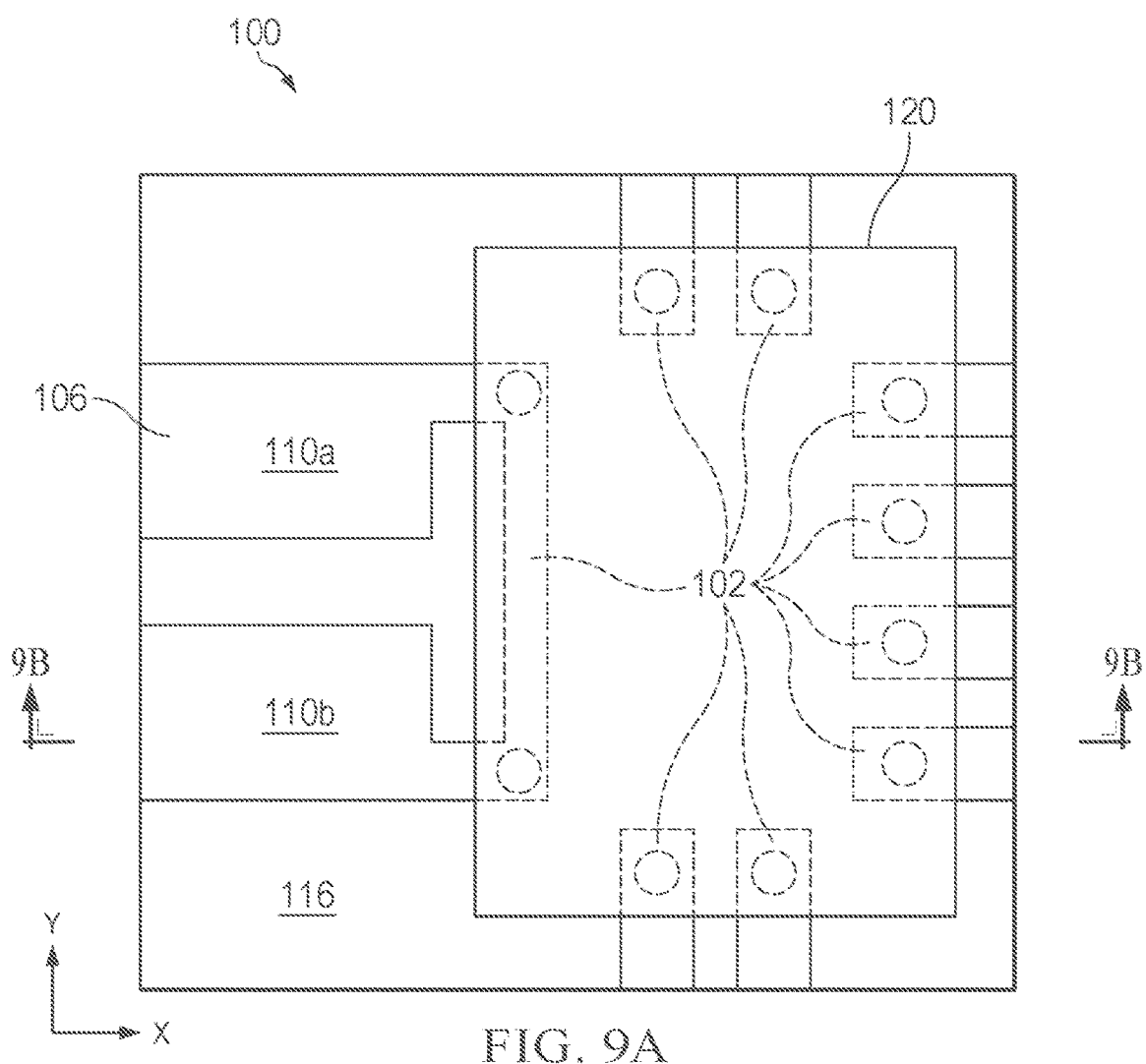
Figure 9B:
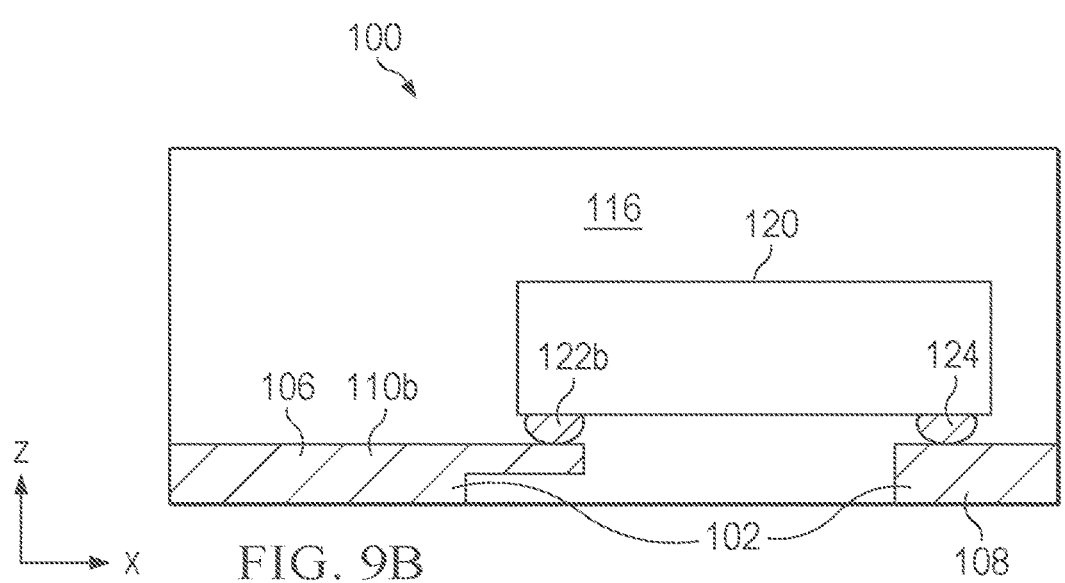

As shown in FIG. 9A (top view) and FIG. 9B (cross-sectional side view through line 9B-9B shown in FIG. 9A), the resulting structure after the cutting corresponds with the example IC package 100 shown in FIGS. 1A-1E, wherein the remaining portions of the leadframe 300 in the IC package 100 (i.e., after cutting away the leadframe carrier structure 302) define the partial leadframe 102, which includes the shunt resistor leadframe element 106 and external contact leadframe elements 108.

Figure 10A:
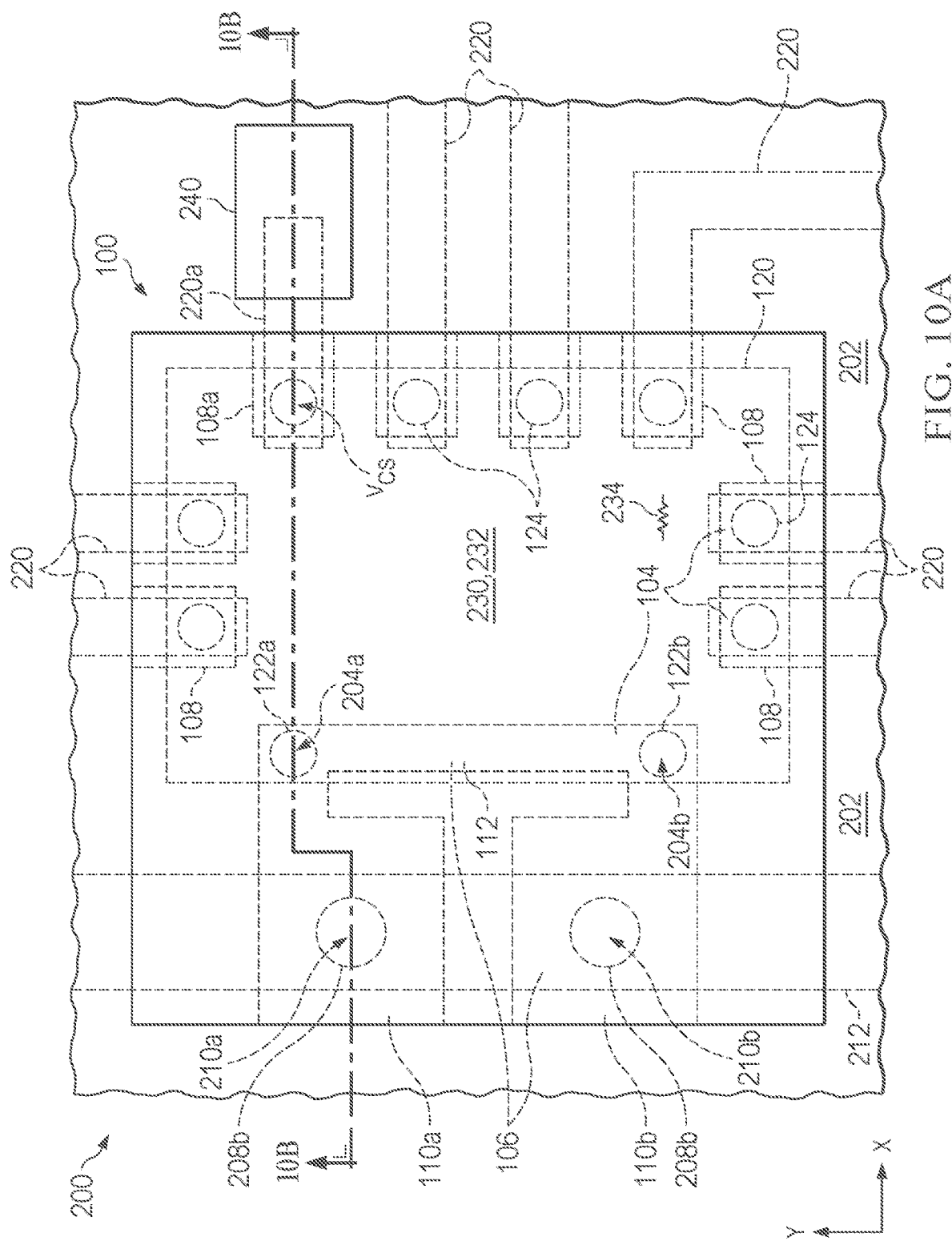
Figure 10B:
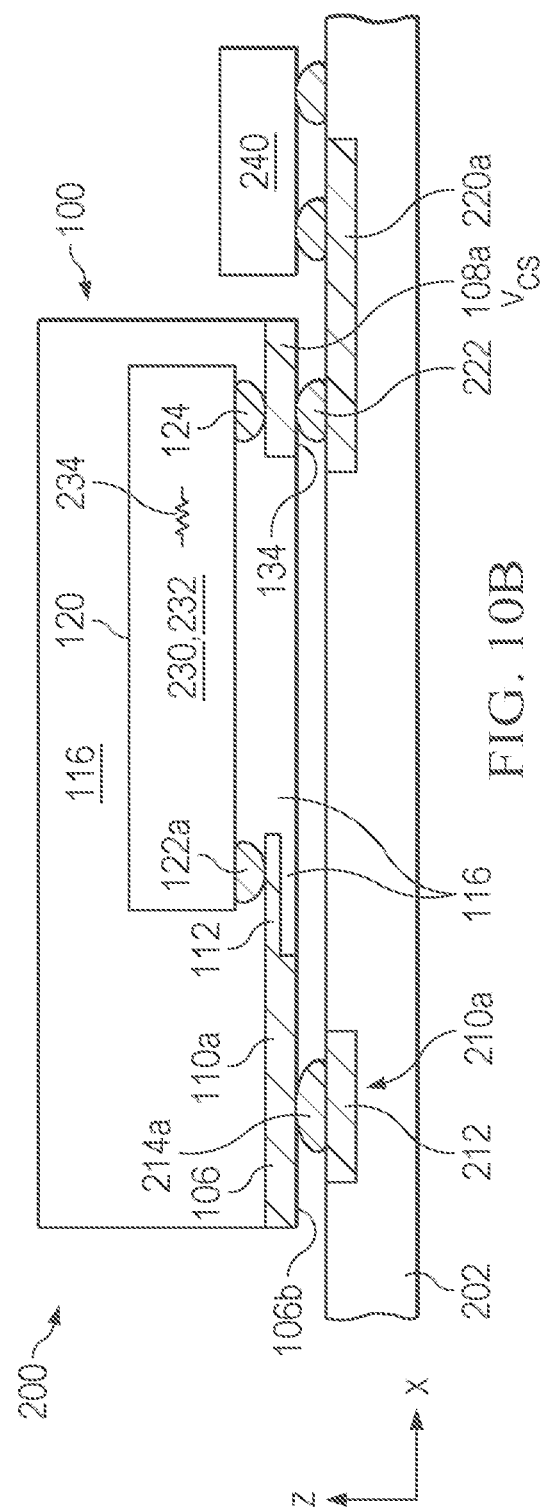

As shown in FIG. 10A (top view) and FIG. 10B (cross-sectional side view through line 10B-10B shown in FIG. 10A), the example IC package 100 may be mounted to the electronic device substrate 202, e.g., a PCB. In this example, the IC package 100 is solder mounted to the electronic device substrate 202, by (a) solder bonds 214a and 214b connecting the bottom sides of the shunt resistor contacts 110a and 110b to monitored nodes 210a and 210b, respectively, and (b) respective solder bonds 222 connecting outer surfaces 134 of respective external contact leadframe elements 108 to respective conductive elements (e.g., metal traces) 220 (including conductive element 220a, as shown in FIG. 10B). The respective locations of both solder bonds 214a and 214b are shown in FIG. 2D, discussed above.

Although example embodiments have been described above, other variations and embodiments may be made from this disclosure without departing from the spirit and scope of these embodiments.

The invention claimed is:
1. An integrated circuit (IC) package, comprising:
 a partial leadframe extending in a first plane and comprising:
  a shunt resistor leadframe element, the shunt resistor leadframe element comprising a one-piece homogenous structure including:
   a pair of shunt resistor contacts each having an outer surface; and a shunt resistor conductively connected between the pair of shunt resistor contacts, the shunt resistor having a recessed outer surface that is recessed from the outer surfaces of the shunt resistor contacts in a direction perpendicular to the first plane;

at least one external contact leadframe element separate from the shunt resistor leadframe element; and a mold encapsulation formed over the partial leadframe;

wherein the at least one external contact leadframe element and the outer surfaces of the pair of shunt resistor contacts are externally contactable through the mold encapsulation, but the mold encapsulation covers the recessed outer surface of the shunt resistor such that the shunt resistor is not externally contactable through the mold encapsulation.

2. The IC package of claim 1, wherein the partial leadframe is formed from pure copper.

3. The IC package of claim 1, comprising an IC die connected to the shunt resistor leadframe element, the IC die comprising current sense circuitry to sense a current through the shunt resistor, wherein the mold encapsulation is formed over the IC die.

4. The IC package of claim 3, wherein the IC die is solder bonded to the shunt resistor at a pair of spaced apart locations on the shunt resistor.

5. The IC package of claim 3, wherein:
the shunt resistor leadframe element has a first side and a second side opposite the first side;
the IC die is connected to the shunt resistor on the first side of the shunt resistor leadframe element; and
respective surfaces of the pair of shunt resistor contacts on the second side of the shunt resistor leadframe element are exposed through the mold encapsulation.

6. The IC package of claim 3, wherein the current sense circuitry in the IC die comprises a temperature compensation resistor, wherein a temperature coefficient of resistance of the temperature compensation resistor differs from a temperature coefficient of resistance of the shunt resistor by less than 5%.

7. The IC package of claim 3, wherein the current sense circuitry in the IC die comprises a current sense amplifier to provide a voltage representing a current through the shunt resistor.

8. The IC package of claim 3, wherein:
the IC die is connected to the at least one external contact leadframe element; and
the current sense circuitry in the IC die comprises a current sense amplifier to provide a current sense voltage at a respective external contact leadframe element of the at least one external contact leadframe element.

9. The IC package of claim 8, wherein:
the IC die is connected to a respective first side of the at least one external contact leadframe element; and
a respective second side of the at least one external contact leadframe element, opposite the respective first side of the at least one external contact leadframe element, is exposed through the mold encapsulation.

10. The IC package of claim 1, wherein the IC package comprises a flat, no leads package.

11. The IC package of claim 1, wherein the partial leadframe is formed from a copper alloy.

12. The IC package of claim 1, wherein:
the partial leadframe extends in a first plane;
each of the pair of shunt resistor contacts has a first thickness in a first direction perpendicular to the first plane; and the shunt resistor has a second thickness, smaller than the first thickness, in the first direction.

13. An integrated circuit (IC) package, comprising:
an integrated shunt resistor element including:
a pair of shunt resistor contacts each having an outer surface; and
a shunt resistor conductively connected between the pair of shunt resistor contacts, the shunt resistor having a recessed outer surface that is recessed from the outer surfaces of the shunt resistor contacts in a direction perpendicular to the first plane;
an external contact element separate from the integrated shunt resistor element, the external contact element allowing external contact to the IC package; and
an IC die connected to the integrated shunt resistor element and connected to the external contact element, the IC die comprising current sense circuitry to sense a current through the shunt resistor, the current sense circuitry including a temperature compensation resistor, wherein a temperature coefficient of resistance of the temperature compensation resistor differs from a temperature coefficient of resistance of the shunt resistor by less than 5%;
mold encapsulation formed over the integrated shunt resistor element and the IC die and the partial leadframe;
wherein the outer surfaces of the pair of shunt resistor contacts are externally contactable through the mold encapsulation, but the mold encapsulation covers the recessed outer surface of the shunt resistor such that the shunt resistor is not externally contactable through the mold encapsulation.

14. The IC package of claim 13, wherein the temperature coefficient of resistance of the temperature compensation resistor differs from the temperature coefficient of resistance of the shunt resistor by less than 1%.

15. The IC package of claim 13, wherein the IC die is solder bonded to the shunt resistor at a pair of spaced apart locations on the shunt resistor.

16. The IC package of claim 13, wherein the current sense circuitry in the IC die comprises a current sense amplifier to provide a current sense voltage at the external contact element, the current sense voltage representing a current across the shunt resistor.

17. The IC package of claim 13, wherein:
the shunt resistor element has a first side and a second side opposite the first side;
the IC die is connected to the shunt resistor on the first side of the shunt resistor element; and
respective surfaces of the pair of shunt resistor contacts on the second side of the shunt resistor element are exposed through the mold encapsulation.

18. The IC package of claim 13, wherein the integrated shunt resistor element and the external contact element comprises components of a partial leadframe.

19. The IC package of claim 13, wherein the integrated shunt resistor element and the external contact element comprises components of a partial leadframe formed from pure copper or a copper alloy.

20. The IC package of claim 13, wherein:
the integrated shunt resistor element extends in a first plane;
each of the pair of shunt resistor contacts has a first thickness in a first direction perpendicular to the first plane; and
the shunt resistor has a second thickness, smaller than the first thickness, in the first direction.

21. A method of forming an electronic device, comprising:
forming an integrated circuit (IC) package by a process including:
preparing a leadframe including a leadframe carrier structure and a shunt resistor leadframe element extending from the leadframe carrier structure, the shunt resistor leadframe element comprising a one-piece homogenous structure including a shunt resistor conductively connected between a pair of shunt resistor contacts, wherein preparing the leadframe includes performing an etch that forms a recessed outer surface relative to respective outer surfaces of the shunt resistor contacts, and thereby reduces a thickness of the shunt resistor relative to the shunt resistor contacts;
mounting an IC die to the leadframe, the IC die including current sense circuitry;
wherein mounting the IC die to the leadframe connects the current sense circuitry in the IC die to the pair of shunt resistor contacts;
forming a mold encapsulation over the shunt resistor leadframe element and over the IC die, wherein the pair of shunt resistor contacts are externally contactable through the mold encapsulation, and wherein the recessed outer surface of the shunt resistor resulting from the etch is covered by the mold encapsulation such that the shunt resistor is not externally contactable through the mold encapsulation; and
cutting away the leadframe carrier structure.

22. The method of claim 21, wherein the current sense circuitry in the IC die comprises a temperature compensation resistor, wherein a temperature coefficient of resistance of the temperature compensation resistor differs from a temperature coefficient of resistance of the shunt resistor by less than 5%.

23. The method of claim 21, wherein:
the leadframe includes at least one external contact leadframe element extending from the leadframe carrier structure; and
mounting the IC die to the leadframe resistor comprises connecting the IC die to the at least one external contact leadframe element, wherein the current sense circuitry comprises a current sense amplifier to provide a current sense voltage at a respective external contact leadframe element of the at least one external contact leadframe element.

* * * * *